United States Patent [19]

Nakamura

[11] 4,323,981
[45] Apr. 6, 1982

[54] CENTRAL PROCESSING UNIT WITH IMPROVED ALU CIRCUIT CONTROL

[75] Inventor: Norimitsu Nakamura, Oume, Japan

[73] Assignee: Tokyo Shibaura Denki Kabushiki Kaisha, Japan

[21] Appl. No.: 953,743

[22] Filed: Oct. 23, 1978

[30] Foreign Application Priority Data

Oct. 21, 1977 [JP] Japan .................. 52-125778

[51] Int. Cl.³ .............................................. G06F 7/50
[52] U.S. Cl. ..................... 364/749; 364/200; 364/768; 364/787
[58] Field of Search ............. 364/200 MS File, 749, 364/768, 787

[56] References Cited

U.S. PATENT DOCUMENTS

| | | | |
|---|---|---|---|
| 3,984,670 | 10/1976 | Erickson et al. | 364/200 X |
| 3,987,291 | 10/1976 | Gooding et al. | 364/787 |
| 3,988,717 | 10/1976 | Kisylia | 364/200 |
| 4,161,784 | 7/1979 | Cushing et al. | 364/749 X |

OTHER PUBLICATIONS

Advanced Micro Devices, Inc., "AM2900 Bipolar Microprocessor Family Data Book", pp. 17-18, Copyright 1976.
Advanced Micro Devices, Inc., "AM2900 Learning and Evaluation Kit User's Manual", pp. 1—1 to 3—3, Copyright 1976.
Advanced Micro Devices, Inc., "AM2900 Bipolar Microprocessor Circuits", pp. 1-15 and 28-33, Copyright 1975.

Primary Examiner—Jerry Smith
Attorney, Agent, or Firm—Finnegan, Henderson, Farabow, Garrett & Dunner

[57] ABSTRACT

An information processor is provided with a plurality of ALU chips under control of a microprogram and an ALU control circuit for controlling the ALU chips. The ALU control circuit responds to data bus information given thereto to select an ALU chip from which flag data is outputted. The ALU control circuit controls the ALU chip specified by the data bus information to operate it. When a carry is produced in the selected ALU chip, a carry generator is so controlled to produce a given carry signal toward a given ALU chip.

15 Claims, 22 Drawing Figures

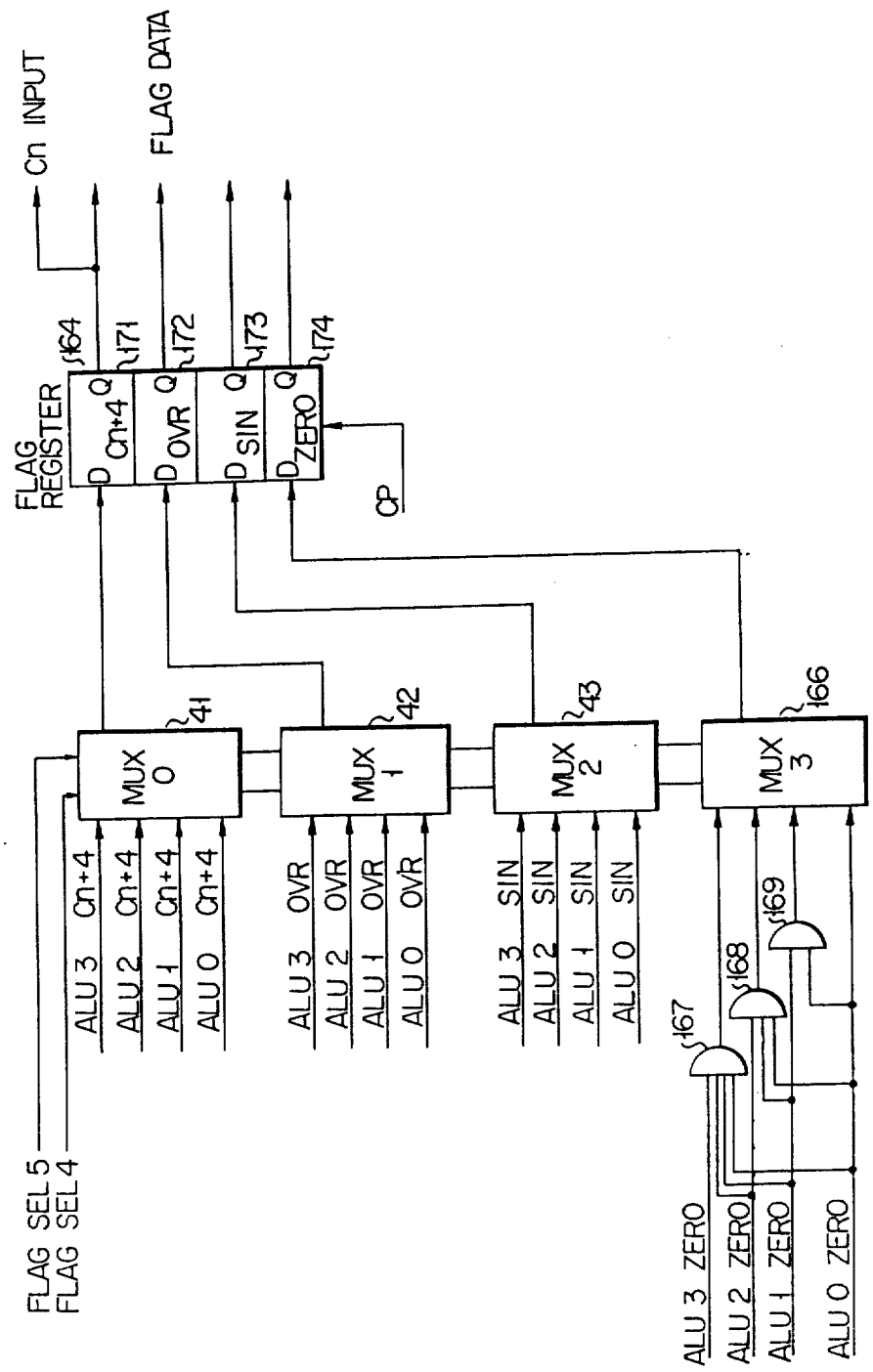
F I G. 3

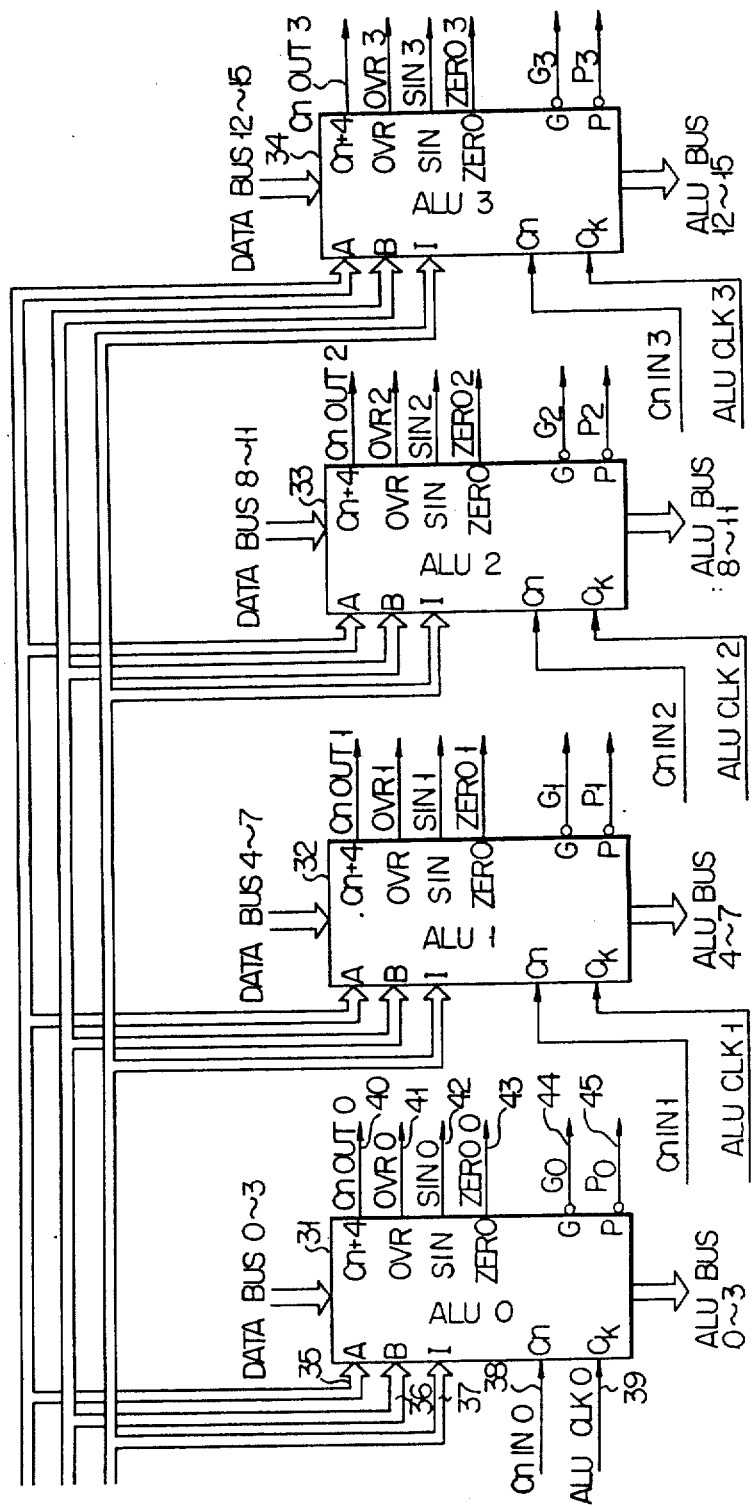
F I G. 4

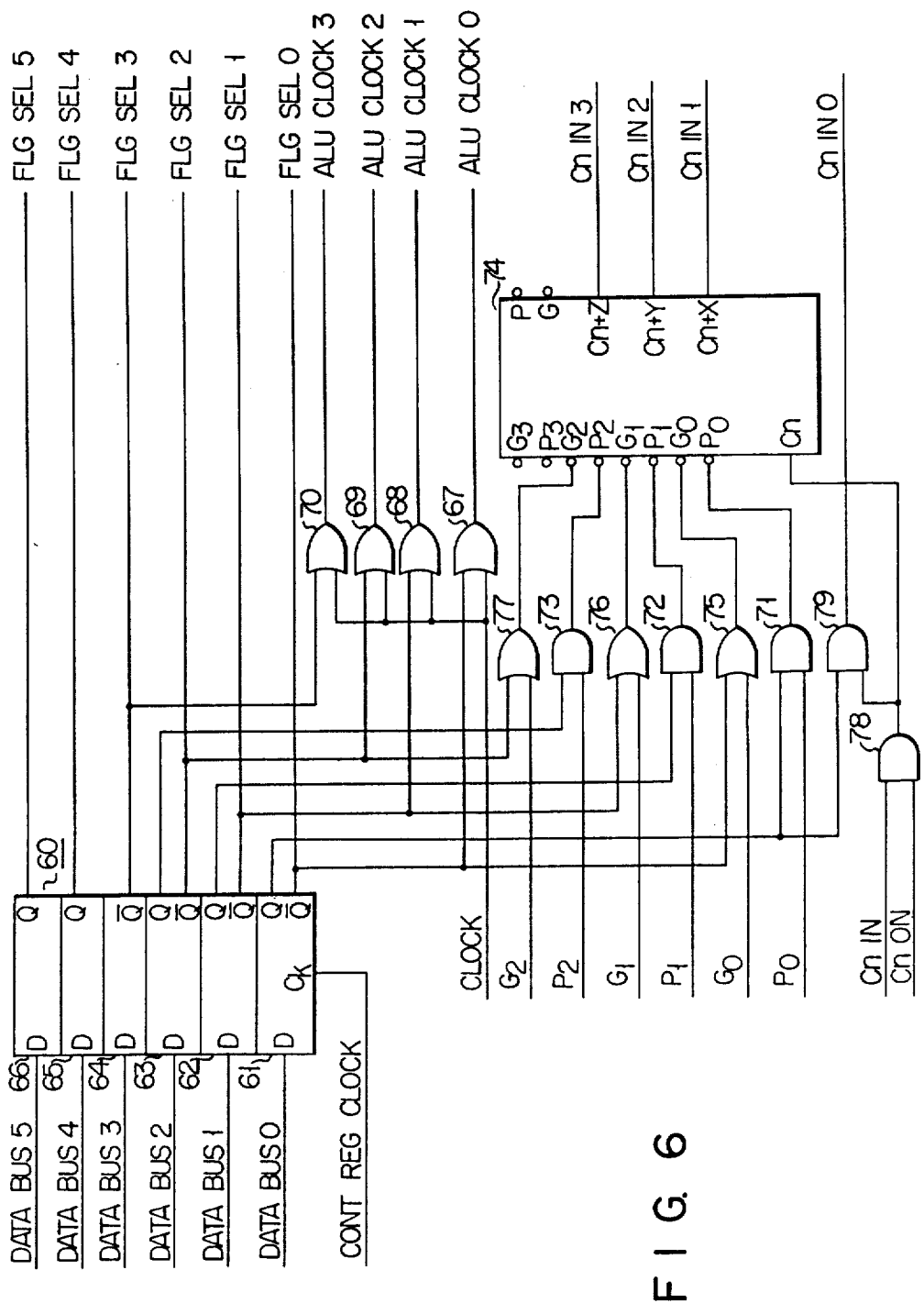
F I G. 6

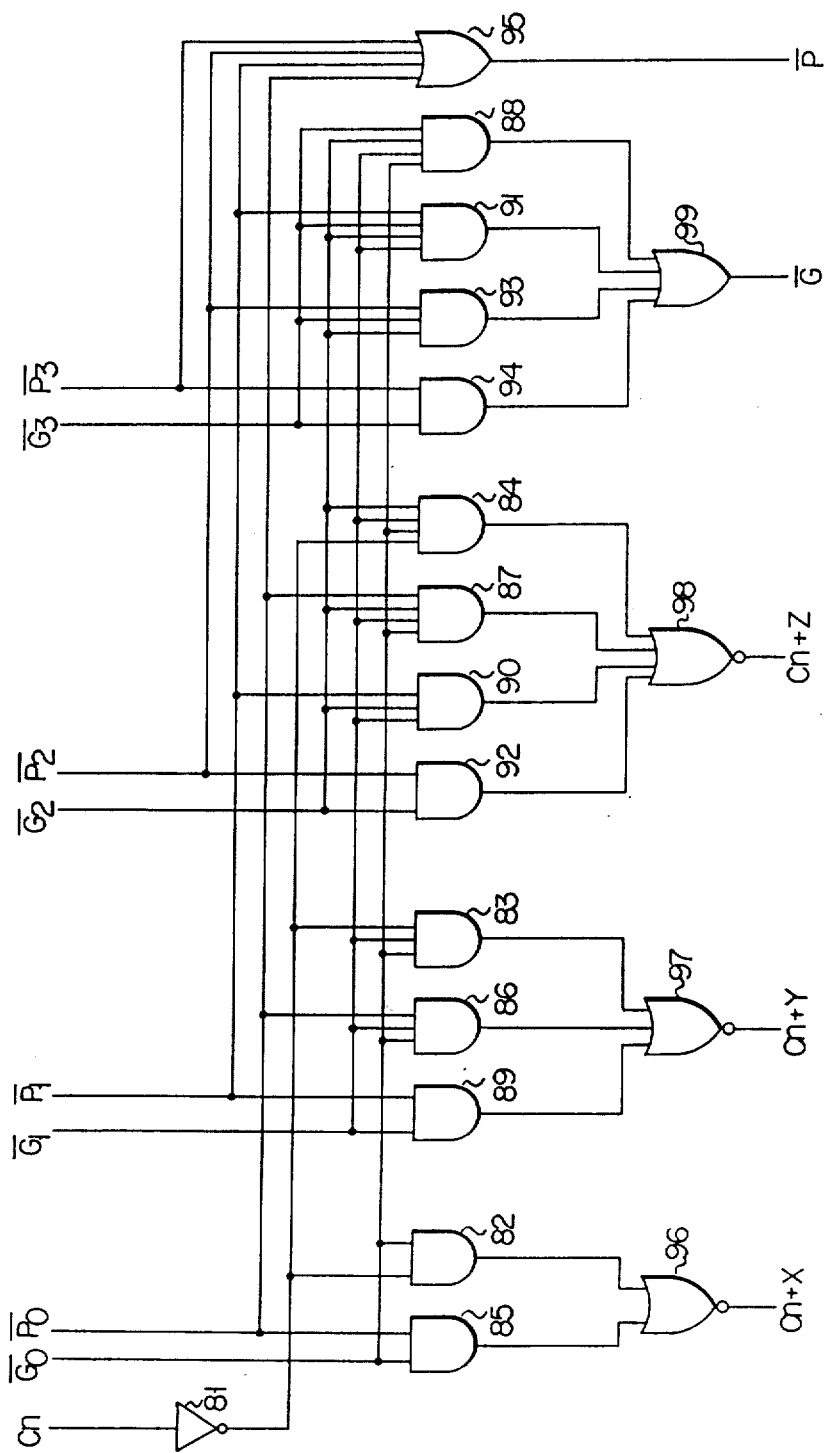
F I G. 7

FIG. 9

| CONTROL REGISTER SET DATA | | | | | | ALU SELECT | | | |
|---|---|---|---|---|---|---|---|---|---|
| b5 | b4 | b3 | b2 | b1 | b0 | | | | |
| 0 | 0 | 0 | 0 | 0 | 1 | ALU 0 | | | |
| 0 | 1 | 0 | 0 | 1 | 1 | ALU 0 | ALU 1 | | |
| 1 | 0 | 0 | 1 | 1 | 1 | ALU 0 | ALU 1 | ALU 2 | |
| 1 | 1 | 1 | 1 | 1 | 1 | ALU 0 | ALU 1 | ALU 2 | ALU 3 |
| 0 | 1 | 0 | 0 | 1 | 0 | | ALU 1 | | |
| 1 | 0 | 0 | 1 | 1 | 0 | | ALU 1 | ALU 2 | |
| 1 | 1 | 1 | 1 | 1 | 0 | | ALU 1 | ALU 2 | ALU 3 |
| 1 | 0 | 0 | 1 | 0 | 0 | | | ALU 2 | |
| 1 | 1 | 1 | 1 | 0 | 0 | | | ALU 2 | ALU 3 |
| 1 | 1 | 1 | 0 | 0 | 0 | | | | ALU 3 |

CENTRAL PROCESSING UNIT WITH IMPROVED ALU CIRCUIT CONTROL

FIELD OF THE INVENTION

The invention relates to an information processor having a plurality of arithmetic/logic units of the bit-slice type and operating under control of microprogram.

PRIOR ART

There has been known a system, called a bit-slice system, in which a processor is constructed by coupling arithmetic/logic units each operating with bit number smaller than the bit number of one word data length. The conspicuous advantage of the bit-slice system is that a computer with any data length may flexibly be constructed in accordance with its use. In other words, it eliminates the need for use of different processors in compliance with the respective uses or it enables a single processor to flexibly be adapted to various uses. The useful feature of the bit-slice system permits the bit-slice processors to be manufactured in mass production. The processors thus producted which now are commercially available are AM2901, for example, manufactured by Advanced Micro Devices, Inc. The bit-slice processor is constructed by a single IC chip with 4 bits. In the information processor having a combination of the bit-slice arithmetic/logic units (ALU), it is common practice that each control flag is outputted from the most significant chip. In the case, for example, where a processor of sixteen bits has a combination of four chips; chip 1 (bits 0 to 3), chip 2 (bits 4 to 7), chip 3 (bits 8 to 11), and chip 4 (bits 12 to 15), the control flag of the processor is outputted from the chip 4.

When a decimal operation is carried out by using the processor with such a construction, data is operated in binary mode by the ALU and then converted into a decimal mode by a binary-decimal converter. For the carry-flag control of the ALU, a ripple carry method or a carry lookahead method is employed. In the ripple carry method, the carry output of each device is coupled with a carry input of the next more significant device.

In the operation process, various bit numbers are operated. In this case, an information processor using conventional bit-slices is unable to pack data. For example, in the case where a 4 bits operation is performed in a 16 bit information processor, it must be operated in the form of 16 bits operation by adding leading zeros to a 4-bit string. Additionally, when a decimal operation is performed, (a decimal operation is carried out in most business computers) data must be converted into a decimal form by using a binary-decimal converter usually included in the processor after binary operation is performed. Incidentally, most of the data processors controlled by a microprogram execute operations in decimal form.

Accordingly, an object of the invention is to provide an information processor having a plurality of bit-slice type ALU chips and operating under control of a microprogram in which any flags from the ALU chips may selectively be outputted.

Another object of the invention is to provide an information processor having a plurality of bit-slice type ALU chips and operating under control of a microprogram in which a combination of the ALU chips may be changed under control of the microprogram to be used as ALUs with different bit numbers.

An additional object of the invention is to provide an information processor having a plurality of bit-slice type ALU chips and operating under control of a microprogram in which, under control of the microprogram, ALU chip groups may execute operations independently or these may do it as a single ALU unit.

To achieve the objects of the invention, there is provided an information processor with a central processing unit having a plurality of ALU chips and operating under control of a microprogram, in which said central processing unit comprises: a read only memory for storing a microprogram; a microprogram sequencer, which is connected to the read only memory, for providing an execution address of the microprogram; a read only memory data register, which is connected to the read only memory, for latching a microprogram data read out from the read only memory; arithmetic/logic units, which are connected to the read only memory data register and a data bus, for operating data fed from the data bus in accordance with instructions given from the read only memory data register; and an arithmetic/logic control circuit, which is connected to the arithmetic/logic units and the data bus, for controlling the arithmetic/logic units by a data bus signal fed through the data bus under control of the microprogram.

Other objects and features of the invention will be apparent from the following description taken in connection with the accompanying drawings, in which:

FIG. 3 shows a block diagram of a flag selection circuit for selectively producing flags transferred from the arithmetic/logic circuit shown in FIG. 2;

FIG. 4 shows a block diagram of the ALU circuits used in another embodiment of the invention;

FIG. 6 shows a block diagram of an ALU control circuit for controlling the respective ALU circuits shown in FIG. 4;

FIG. 7 shows a logic circuit of a carry lookahead generator;

FIG. 9 shows a table tabulating the relations between bit image set in control register (60) and ALU chips selected;

Figure 1:
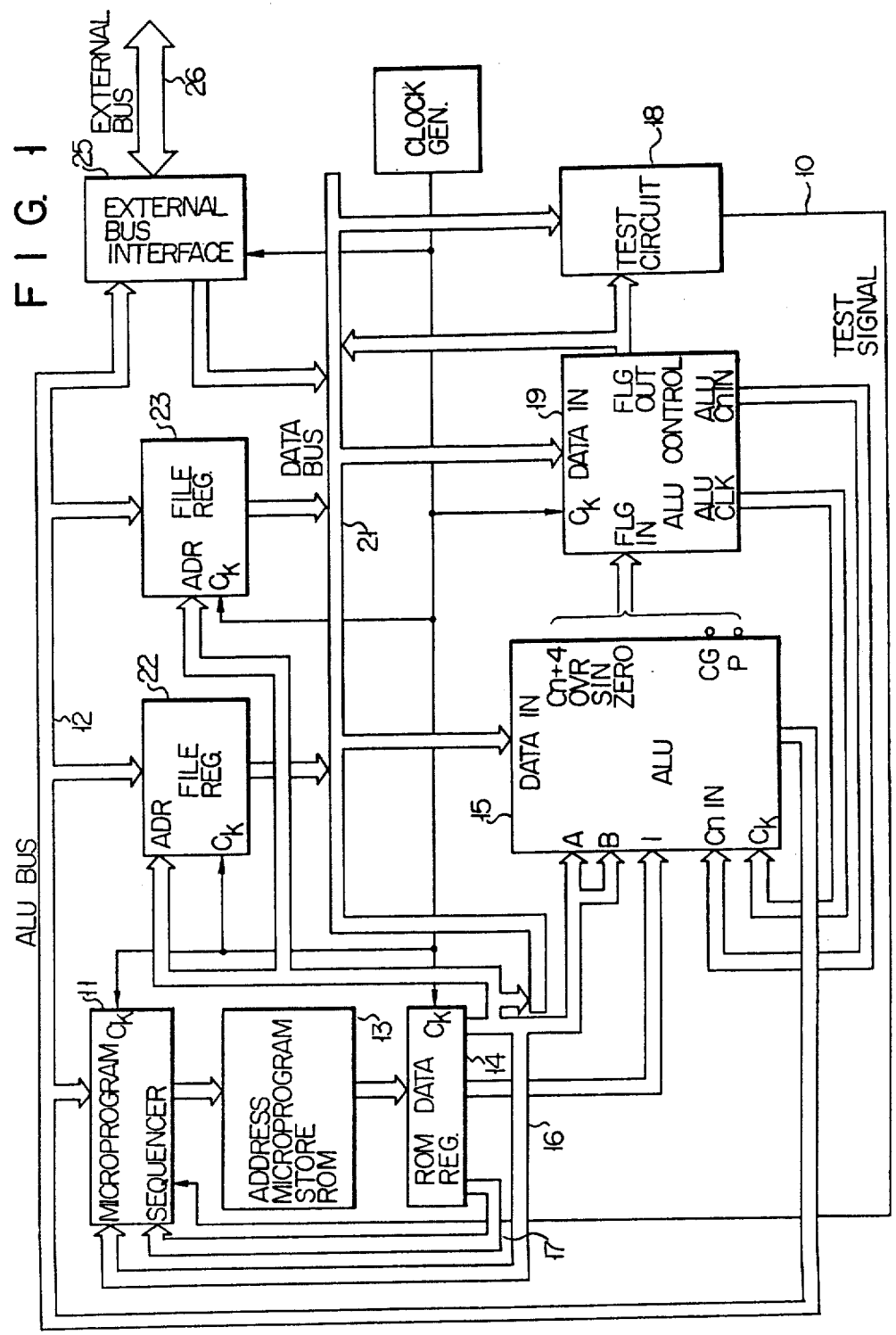
FIG. 1 shows a block diagram of a central processing unit (CPU) according to the invention.

Reference is first made to FIG. 1 illustrating the concept of a central processing unit (CPU) used in an information processor according to the invention. In the figure, a microprogram sequencer 11 is connected to an arithmetic/logic unit bus (referred to as an ALU bus) 12 and a microprogram storing read only memory 13 (referred to as a microprogram store ROM). The microprogram store ROM 13 stores a group of microprograms. The microprogram sequencer 11 supplies execution addresses so as to control the addresses of each microprogram stored in the ROM 13.

When the execution address of the miroprogram is supplied by the sequencer 11, the microprogram corresponding to the address is outputted to a read only memory data register 14 (ROM data register) connected to the output terminal of the microprogram store ROM 13. In the ROM data register 14, each instruction of the microprogram outputted from the microprogram store ROM 13 is latched by a clock and the microprogram instruction latched is outputted to an arithmetic/logic unit 15 and at the same time control signals and control data are supplied to the other respective circuits where it is executed.

To the microprogram sequencer 11 is supplied a jump address corresponding to a JUMP instruction of the microprogram stored in the microprogram store ROM 13, by way of an address ROM 16 and the address is stored in the microprogram sequencer 11.

A test signal to communicate test conditions such as JUMP is delivered from a test circuit 18 through a test signal line 10.

The control data is supplied from the ROM data register 14 to the microprogram sequencer 11, through the data bus 17. The control data controls JUMP instructions of the microprogram, stack and the like. The ALU 15 performs various arithmetic operations and logical operations and the results of the operations are controlled by an ALU control circuit 19. The ALU 15 and the ALU control circuit 19 will subsequently be described later in detail.

In the test circuit 18, the condition when the JUMP instruction is produced is tested. The test data is set in the test circuit 18 by delivering the data part of the microprogram instruction from the ROM data register 14 to the test circuit 18 via the data bus 21. Flag information is also transferred to the test circuit 18 by way of the ALU control circuit 19. Accordingly, the test circuit 18 tests the data of the microprogram instruction and the flag data to produce test signals.

File registers 22 and 23 are used to file data necessary for microprogram processing. When the microprogram instruction is an instruction to file the result of the operation by the ALU 15 in the file register, the operation result of the ALU 15 transferred through the ALU bus 12 is filed in the file address specified by the ROM data register 14. On the other hand, if the microprogram instruction is an instruction to operate by using the data in the file register, the ROM data register 14 produces the data of the file address specified toward the data bus 21.

An exterior bus interface 25 is connected to the ALU bus 12 and the data bus 21 and by way of an exterior bus 26 to a plurality of I/O devices and a memory device. The external bus interface 25 is provided with registers for data transmission and reception circuit, an external bus competition circuit, an interput control circuit and the like.

Figure 2:
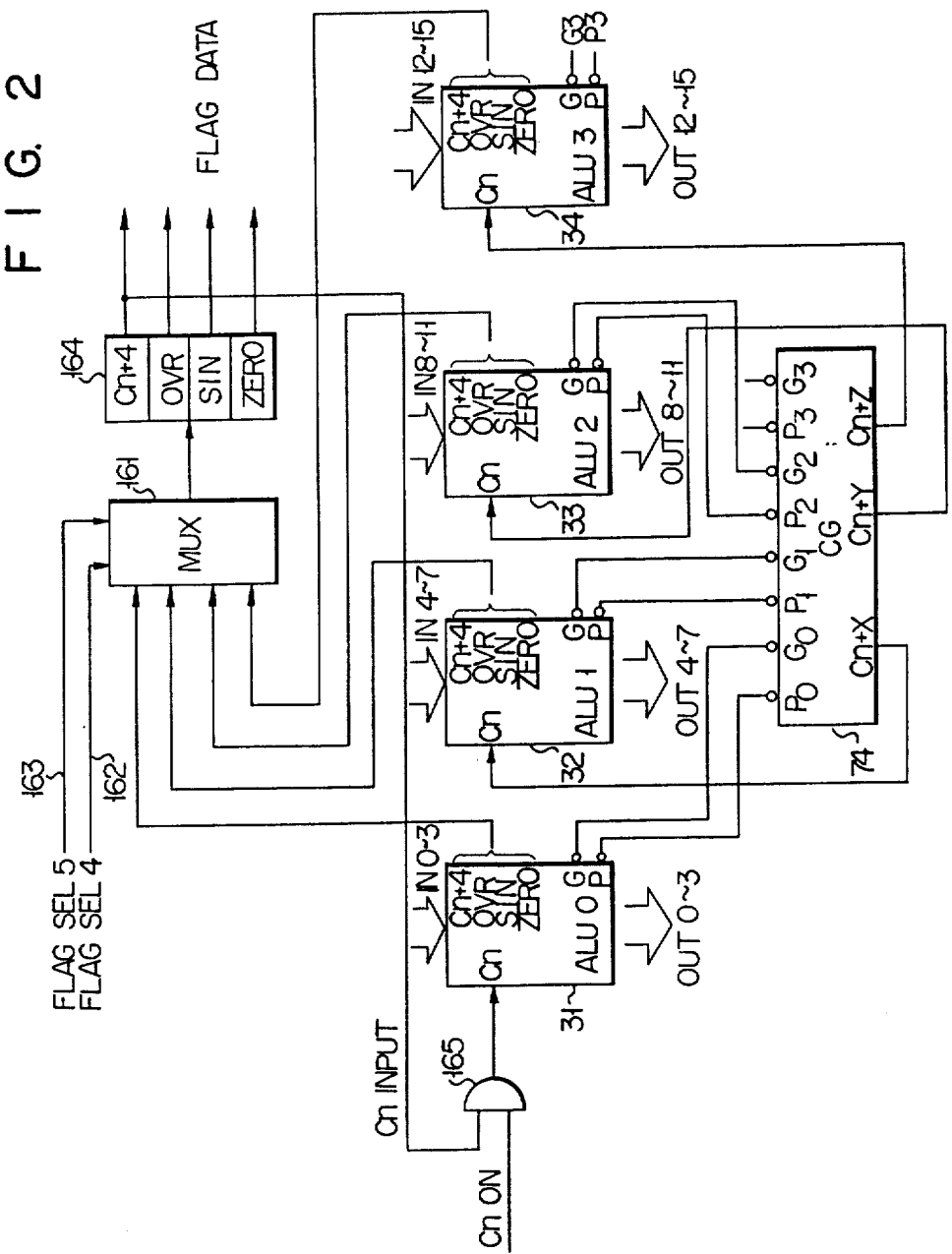
FIG. 2 shows an arithmetic/logic unit and its related circuit used in the CPU of FIG. 1.

Referring now to FIG. 2, there is shown the details of the arithmetic/logic circuit and its associated circuit which are used in the CPU shown in FIG. 1. In the figure, bits 0 to 3 are assigned to an ALU0 31; bits 4 to 7 to an ALU1 32; bits 8 to 11 to an ALU2 33; bits 12 to 15 to an ALU3 34. P terminal (propagate carry) and G terminal (generate carry) of the ALU0 31 are coupled with a first P terminal (P0) and a first G terminal (G0) of a lookahead carry generator 74. P terminal and G terminal of the ALU1 32 are connected to a second P terminal (P1) and a second G terminal (G1) of the carry generator 74. P terminal and G terminal of the ALU2 33 are connected to a third P terminal (P2) and a third G terminal (G2) of the carry generator 74. A carry flag terminal $C_n+4$, an overflow flag terminal OVR, a sign flag terminal SIN, and a zero flag terminal ZERO of each arithmetic/logic unit, ALU0 31, ALU1 32, ALU2 33 and ALU3 34, are all connected to the corresponding input terminals of a multiplexer 161. To the multiplexer 161 are inputted flag select signals FLAG SEL4 162 and FLAG SEL5 163.

These flag select signals are controlled by the microprogram and are used to decide which of the flag outputs from the ALUs 31, 34 is set in a flag data register to be described later. For example, when FLAG SEL4 162 and FLAG SEL5 163 are both "0", the flag output from the ALU0 31 is selected. When the FLAG SEL4 162 is "1" and the FLAG SEL5 163 is "0", the flag output from the ALU1 32 is selected. Similarly, when the FLAG SEL4 162 is "0" and the FLAG SEL5 163 is "1", the flag output from ALU2 33 is selected. When the FLAG SEL4 162 is "1" and the FLAG SEL5 163 is "1", the flag output from ALU3 34 is selected. The multiplexer 161 is connected at the output to the flag data register 164 where only one set of a carry flag, an overflow flag, a sign flag and a zero flag is set therein. Output terminals $C_n+x$, $C_n+y$, and $C_n+z$ of the carry generator 74 are connected to the carry input terminals $C_n$ of the arithmetic/logic circuits ALU1 32 to ALU3 34, respectively. When a carry occurs in the operation by ALU0 31, the carry generator 74 produces a signal of HIGH level at the terminal $C_n+x$ which in turn is applied as a carry signal to the carry input terminal $C_n$ of the ALU1 32. When a carry occurs in the operation by the ALU1 32, the carry generator 74 produces a signal of HIGH level at the terminal $C_n+y$ which in turn is applied as a carry signal to the carry input terminal $C_n$ of the ALU2 33. Further, when the operation of ALU2 33 produces a carry, the terminal $C_n+z$ of the carry generator 74 outputs a HIGH level signal and a carry signal is applied to the carry input terminal $C_n$ of ALU3 34.

To the carry input terminal $C_n$ of the first arithmetic/logic unit 31 is applied a carry flag signal $C_n+4$ of the flag data register 164, through an AND circuit 165. To another input terminal of the AND gate 165 is applied a carry signal CnON which is set by the microprogram. The carry signal CnON is applied upon raise of the carry flag when a carry occurs as a result of the operation and its carry signal must be applied.

FIG. 3 shows a circuit diagram of a flag selection circuit for selectively receiving the flags from the respective ALUs shown in FIG. 2 and outputting the selected one. In the figure, multiplexers 41 to 43 and 166 constitute the multiplexer 161. The multiplexers 41 to 43 and 166 are connected at the input terminals to the respective flag output terminals of the arithmetic/logic unit 31 to 34, as shown. That is, carry flag signals from the ALUs 31 to 34 are applied to the first multiplexer 41; overflow flag signals to the second multiplexers 42; flag signals to the third multiplexers 43. Zero flag signals from ALU0 to ALU3 are applied to the fourth multiplexer 166, through first to third AND circuits 167 to 169. In the 4-bit operation, that it is to say, when the ALU0 chip is used, the zero flag from ALU0 31 is directly applied to the multiplexer 166. In the 8-bit operation, when the operation results of both ALU0 and ALU1 are zero, the zero flag ON signal is applied to the multiplexer 166. Similarly, in the 16-bit operation, the ALUs 31 to 34 are all zero in the results of the operations, the zero flag ON signal is applied to the multiplexer 166. The output signals of the respective multiplexers 41 to 43 and 166 are applied to the flag data register 164. The flag data register 164 is comprised of a carry flag register 171, an overflow flag register 172, a sign flag register 173, and a zero flag register 174. These registers are each constructed by a D-type flip-flop. The output signals of the multiplexers MUX0 to MUX3 are applied to the flag register 164, in response to a flag data register clock signal CP.

The carry lookahead generator 74 is constructed by a logic circuit as shown in FIG. 7. Assume now that a carry takes place in the ALU0 31 of the information processor. Upon the occurrence of the carry, LOW level signals appear at the G and P terminals of the ALU0 31. At this time, if the carry flag of the carry flag register of the flag data register 164 is "OFF", the carry input signal Cn is at LOW level. Accordingly, in a logic circuit in FIG. 7, a signal at LOW level is applied to both input terminals of an AND circuit 85 and the output of the AND circuit 85 becomes at LOW level. An AND circuit 82 receives at one input terminal a carry input signal Cn at HIGH level through an inverter 81 while at the other input a LOW level signal. The AND circuit 82 accordingly produces a signal at LOW level. Therefore, signals at LOW levels are applied to both the input terminals of NOR circuit 96 so that a HIGH level signal appears at the output terminal of the NOR circuit 96. Accordingly, the terminal Cn+x of the carry generator has a signal at HIGH level, and then a carry signal is applied to the carry input terminal of the ALU1 32. When a carry occurs as a result of the operation of the ALU1 32, the terminals G and P of the ALU1 32 are both at LOW level. Accordingly, signals at LOW level are applied to both input terminals of an AND circuit 89 so that the AND circuit 89 becomes at LOW level at the output. A signal at LOW level is applied to all the three input terminals of the AND circuit 86 so that the output of the AND circuit 86 becomes at LOW level. One signal at HIGH level and three signals at LOW level are applied to three input terminals of the AND circuit 83 so that the AND circuit 83 has a LOW level signal at the output terminal. Accordingly, signals at LOW level are applied to three input terminals of the NOR circuit. As a result, the output terminal of the NOR circuit 97 has a HIGH level. Accordingly, the carry generator 74 produces a HIGH level signal from the terminal Cn+1 and a carry signal is applied to a carry input terminal of the ALU2.

When a carry occurs as a result of the operation of the ALU2 33, the ALU2 33 produces signals at HIGH level at the terminals G and P and therefore signals at LOW level are applied to an AND circuit 92 in the logic circuit of FIG. 7. Signals at LOW level are applied to the AND circuits 90 and 87 and three LOW level signals and one HIGH level signal are applied to four input terminals of the AND circuit 84. Accordingly, the outputs of the AND circuit 84, 87, 90 and 92 are all at LOW level. These signals are all applied to the NOR circuit 98 so that the output of the NOR circuit 98 becomes HIGH in level. Accordingly, the carry generator produces a HIGH level at the terminal Cn+z and a carry signal is applied to the carry input terminal Cn of the ALU3 34.

When the operation is accompanied by a carry, a signal at HIGH level is applied from the carry flag register 171 of the flag register 164 to one of the input terminals of the AND circuit 165. Accordingly, if the operation currently performed needs an addition of the carry signal, the carry flag ON signal is set "1" by the microprogram so that the AND circuit 165 produces a signal at HIGH level and thus a carry signal is applied to the ALU0 31. Then, the flags of the ALU0 to ALU3 are applied to the multiplexers MUX0 to MUX3. Accordingly, in the case of the 4-bit operation, if FLAG SELECT4 signal and FLAG SELECT5 signal are both set "0", the respective flags of the ALU0 31 are set in the flag register. In the 8-bit operation, if FLAG SELECT4 signal is set 0 while FLAG SELECT5 signal is set "1", the respective flag of the ALU1 32 are set in the flag register 164. Similarly, in the 12-bit operation, if FLAG SELECT4 is "0" while FLAG SELECT5 is "1", the flags from the ALU2 are selected. In the 16-bit operation, if FLAG SELECT4 and FLAG SELECT5 are both set "1", the respective flags from the ALU3 34 are selected.

With such a construction of the information processor, since the flags from the respective ALU chips may be selected, it is possible to perform an operation of the optimum bit number as required.

FIG. 4 shown in diagrammatical form is the detail of the ALU 15 shown in FIG. 1.

Figure 5:
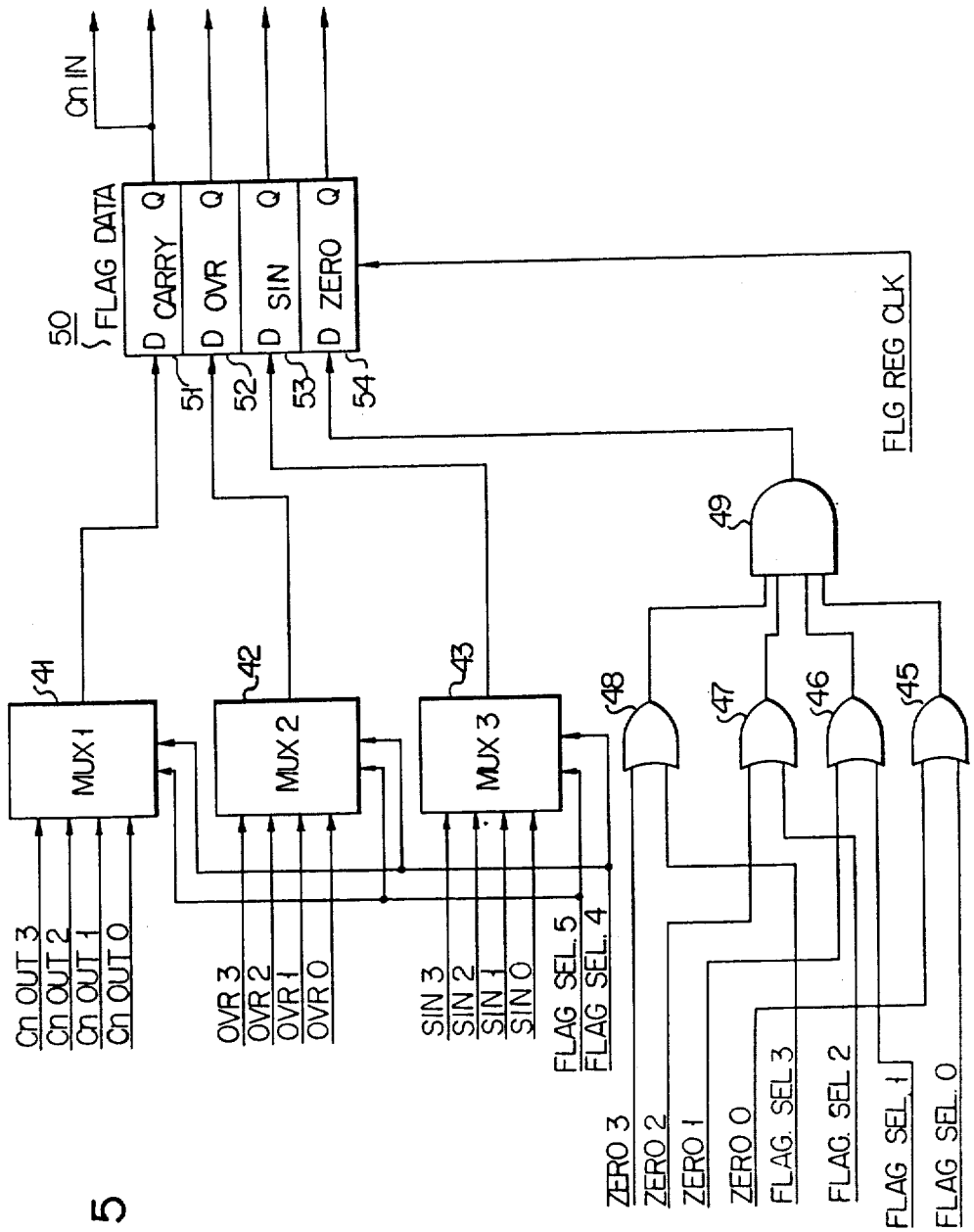
FIG. 5 shows a block diagram of the flag selection circuit for selectively producing flags transferred from the ALU circuits shown in FIG. 4.

FIGS. 4 to 6 show an example in which the flag and clock for each bit slice according to the invention are controlled thereby to permit the operation of each bit slice or their combination.

In the figure, four ALU chips 31 to 34 each constructed by four bits are combined to a 16-bit arithmetic/logic unit. ALU0 31 is assigned to bits 0 to 3 of the data bus; ALU1 32 to bits 4 to 7; ALU2 33 to bits 8 to 11; ALU3 34 to bits 12 to 15. The respective ALUs 31 to 34 are coupled with the ALU bus 12, corresponding to the respective bits of the data bus 21. Each ALU chip is provided with an A address input terminal 35, a B address input terminal 36, an instruction input terminal 37, a carry input terminal 38, and an ALU clock input terminal 39. The output terminals of each ALU chip are a carry flag output terminal 40, an overflow flag output terminal 41, a sign flag output terminal 42, a zero flag output terminal 43, a generator carry flag output terminal 44, and a propagate carry output terminal 45.

The ALU0 31 to ALU3 34 each have a filing function. The ALU has a resistor to be accessible from either A or B address input terminal. The ALU also has an instuction control function such as the selection of the operation modes inputted through the instruction input terminal 37, the operation sources (selection of input data or the like ALU file A&B or the data bus), and a destination control (outputting to ALU file, ALU bus and the like). The ALU 15 additionally has a flag control function. In connection with this, the ALU 15 is provided with a carry input terminal 38 for inputting a carry flag from a lower significant digit, the carry flag (Cn+4) output terminal for outputting the flag representing the result of the operation, the overflow flag (OVR) output terminal 41, the sign flag (SIN) output terminal 42, and the zero flag (ZERO) output terminal 43. The generate carry output terminal 44 and the propagate carry output terminal 45 output signals each representing the carry condition in the operation. The ALU 15, upon receipt of a clock signal CLK at a clock input terminal 39, completes the function within one cycle of the clock.

FIG. 5 which will be described shows the detail of the flag selection circuit for inputting the flag data outputted from the ALUs 31 to 34 in FIG. 4. In the figure, the multiplexer 41 receives carry flags CnOUT0, CnOUT1, CnOUT2 and CnOUT3 fed through the carry flag output terminals of the ALUs 31 to 34. The multiplexer 42 receives overflow flags OVR0, OVR1, OVR2 and OVR3 from the ALUs 31 to 34. The multiplexer 43 receives sign flags SIN0, SIN1, SIN2 and SIN3 from the ALUs 31 to 34. The respective multiplexers 41 to 43 further receive the flag select signals (FLAG SELECT4 and FLAG SELECT5) from the control register 60 (those signals are set by the microprogram). The zero flags zero 0 zero 3 from the ALUs 31 to 34, and the flag select signals FLAG SEL 0 to FLAG SEL 3 are applied to first to fourth OR circuits 45 to 48, respectively. The output signals of the OR circuits 45 to 48 are together applied to an AND circuit 49. The flag signals from the multiplexers MUX1 to MUX3 and the AND circuit 49 are registered in a flag data register 50. The flag register 50, which is comprised of four D-type flip-flops 51 to 54, latches the carry flag, the overflow flag the sign and the zero flag outputted from the multiplexers 41 to 43 and the AND circuit 49, in response to a flag register clock inputted through a clock input terminal. The carry flag, the overflow flag and the sign flag are selected by the FLAG SELECT4 and the FLAG SELECT5, as shown in Table 1.

TABLE 1

| FLAG SEL 5 | FLAG SEL 4 | CARRY FLAG | OVERFLOW FLAG | SIGN FLAG |
|---|---|---|---|---|
| 0 | 0 | CnOUT0 | OVR0 | SIN0 |
| 0 | 1 | CnOUT1 | OVR1 | SIN1 |
| 1 | 0 | CnOUT2 | OVR2 | SIN2 |
| 1 | 1 | CnOUT3 | OVR3 | SIN3 |

As seen from Table 1, when the FLAG SEL 4 and FLAG SEL 5 are both "0", i.e. at LOW level, the carry flag, the overflow flag, and the sign flag from the ALU0 are registered in the flag data register 50. When FLAG SEL 5 is "0" and FLAG SEL 4 is "1", the respective flags from ALU1 are set in the register 50. When FLAG SEL 5 is "1" and FLAG SEL 4 is "0", the respective flags from ALU2 are set in the flag data register 50. When FLAG SEL 4 and FLAG SEL 5 are both "1", the flags from ALU3 are loaded into the register 50.

The zero flags ZERO 0 to ZERO 4 are selected by four flag select signals FLAG SEL 0 to FLAG SEL 3. When the ALU0 chip, for example, is now selected, a LOW signal is applied to one of the input terminals of the OR circuit 45 while HIGH level signals appear at the outputs of the remaining three OR circuits. That is, the FLAG SELECT signals are so selected. Therefore, when the ZERO 0 signal is LOW, the AND circuit 49 produces a LOW level signal. When it is HIGH, the circuit 49 produces a HIGH level signal. The relations between the respective flag signals and the zero flags in the ALUs are as shown in Table 2.

TABLE 2

| FLAG SEL3 | FLAG SEL2 | FLAG SEL1 | FLAG SEL0 | ZERO FLAG | | | |
|---|---|---|---|---|---|---|---|
| 0 | 0 | 0 | 1 | ZERO 0 | | | |
| 0 | 0 | 1 | 1 | ZERO 0 | ZERO 1 | | |
| 0 | 1 | 1 | 1 | ZERO 0 | ZERO 1 | ZERO 2 | |
| 1 | 1 | 1 | 1 | ZERO 0 | ZERO 1 | ZERO 2 | ZERO 3 |
| 0 | 0 | 1 | 0 | | ZERO 1 | | |
| 0 | 1 | 1 | 0 | | ZERO 1 | ZERO 2 | |
| 1 | 1 | 1 | 0 | | ZERO 1 | ZERO 2 | ZERO 3 |
| 0 | 1 | 0 | 0 | | | ZERO 2 | |
| 1 | 1 | 0 | 0 | | | ZERO 2 | ZERO 3 |
| 1 | 0 | 0 | 0 | | | | ZERO 3 |

CONTROL CIRCUIT

FIG. 6 shows a control circuit for providing flag select signals FLAG SEL 0 to FLAG SEL 5 for the multiplexers 41 to 43 and the AND circuit 49, ALU clock signals ALU CLK 0 to ALU CLK 3 for the arithmetic/logic circuits ALU0 to ALU3, and carry input signals CnIN0 to CnIN3 for the terminals Cn of ALUs 31 to 34.

As shown, a control register 60 is comprised of D-type flip-flops 61 to 66. A signal of the data bus 0 is applied to the flip-flop 61; a signal of the data bus 1 to the flip-flop 62; a signal of the data bus 2 to the flip-flop 63; a signal of the data bus 3 to the flip-flop 64; a signal of the data bus 4 to the flip-flop 65; a signal of the data bus 5 to the flip-flop 66. These signals are latched in the D-type flip-flops by the control register clock signal. The signal FLAG SEL 0 is outputted from $\overline{Q}$ terminal of the first flip-flop 61; the signal FLAG SEL 1 from the $\overline{Q}$ terminal of the second flip-flop 62; the signal FLAG SEL 2 from the $\overline{Q}$ terminal of the third flip-flop 63; the signal FLAG SEL 3 from the Q of the fourth flip-flop 64; the signal FLAG SEL 4 from the Q terminal of the fifth flip-flop 65; the signal FLAG SEL 5 from the Q terminal of the sixth flip-flop 66. One input terminal of first to fourth OR circuits 67 to 70 receives the output signals from the $\overline{Q}$ terminals of the first to fourth flip-flops 61 to 64 and the other input terminal thereof a common clock signal. The first to fourth OR circuits produce ALU clock signals ALU CLOCK 0 to ALU CLOCK 3, respectively.

The output signals from the Q terminals of the first to third flip-flops 61 to 63 are applied to one input terminals of first to third AND circuits 71 to 73 of which the other input terminals receive propagate carry signals P0 to P2. The output terminals of the first to third AND circuits 71 to 73 are applied in the inverted state to propagate terminals P0 to P2 of the lookahead carry generator 74. The output signals from the $\overline{Q}$ terminals of the flip-flops 61 to 63 are applied to one input terminal of OR circuits 75 to 77 of which the other input terminals receive generate carry signals G0 to G2. The output signals of the fourth to sixth OR circuits are applied to the generate carry terminals G0 to G2 of the lookahead carry generator 74.

The carry input signals CnIN and CnON are ANDed by a fourth AND circuit 78 and the output of the fourth AND circuit 78 is applied to one input terminal of a fifth AND circuit 79 of which the other input terminal receives an output signal outputted from the Q output terminal of the first flip-flop 61. In this way, the fifth AND circuit 79 produces a first carry input signal CnIN0. Second to fourth carry input signals CnIN1 to CnIN3 are outputted from the output terminals Cn+x, Cn+y and Cn+z of the lookahead carry generator, respectively.

LOOKAHEAD CARRY GENERATOR

The lookahead carry generator shown in FIG. 6 is constructed as shown in FIG. 7, for example. As shown, the carry input signal Cn is applied to AND gates 82 to 84, through an inverter 81. The generate carry signal $\overline{G0}$ is applied to AND gates 82 to 88; the generate carry signal $\overline{G1}$ to AND circuits 89, 86, 83, 87, 84, and 88; the generate carry signal $\overline{G3}$ to AND circuits 94, 93, 91, and 88. The propagate carry signal $\overline{P0}$ is applied to AND circuits 85 to 87 and the OR circuit 95; the propagate carry signal $\overline{P1}$ to AND circuits 89 to 91 and OR circuit 95; the propagate signal $\overline{P2}$ to AND circuits 92 and 93 and OR circuit 95; the propagate signal $\overline{P3}$ to AND circuit 94 and OR circuit 95. The output signals from the AND circuits 85 and 82 are applied to NOR circuit 96 which in turn produces the signal Cn+x.

The output signals from AND circuits 89, 86 and 83 are applied to a NOR circuit 97 which in turn produces a signal Cn+y. The output signals from the AND circuits 92, 90, 87 and 84 are outputted as a signal Cn+z through a NOR circuit 98. The output signals from the AND circuits 94, 93, 91 and 88 are outputted as a $\overline{G}$ signal through an OR circuit 99. The OR circuit 95 produces a $\overline{P}$ signal. The lookahead carry generator 74 thus constructed satisfies the following equations.

$$Cn+x = G0 + P0Cn$$
$$Cn+y = G1 + P1G0 + P1P0Cn$$
$$Cn+z = G2 + P2G1 + P2P1G0 + P2P1P0Cn$$
$$G = G3 + P3G2 + P3P2G1 + P3P2P1G0$$
$$P = P3P2P1P0$$

where G0 to G3: Carry generate inputs, P0 to P3: Carry propagate inputs, Cn: Carry input, Cn+x, Cn+y and Cn+z: Carry output, G: Carry generate output, and P: Carry propagate output.

AM2902 manufactured by Advanced Micro Devices, Inc., for example, contains this type lookahead carry generator.

The control register 60 shown in FIG. 6 includes three registers provided for the respective controls and six registers in this case are D-type flip-flops 61 to 66. The same data of the DATA BUS 0 to DATA BUS 5 are applied to the flip-flops 61 to 66.

Figure 8:
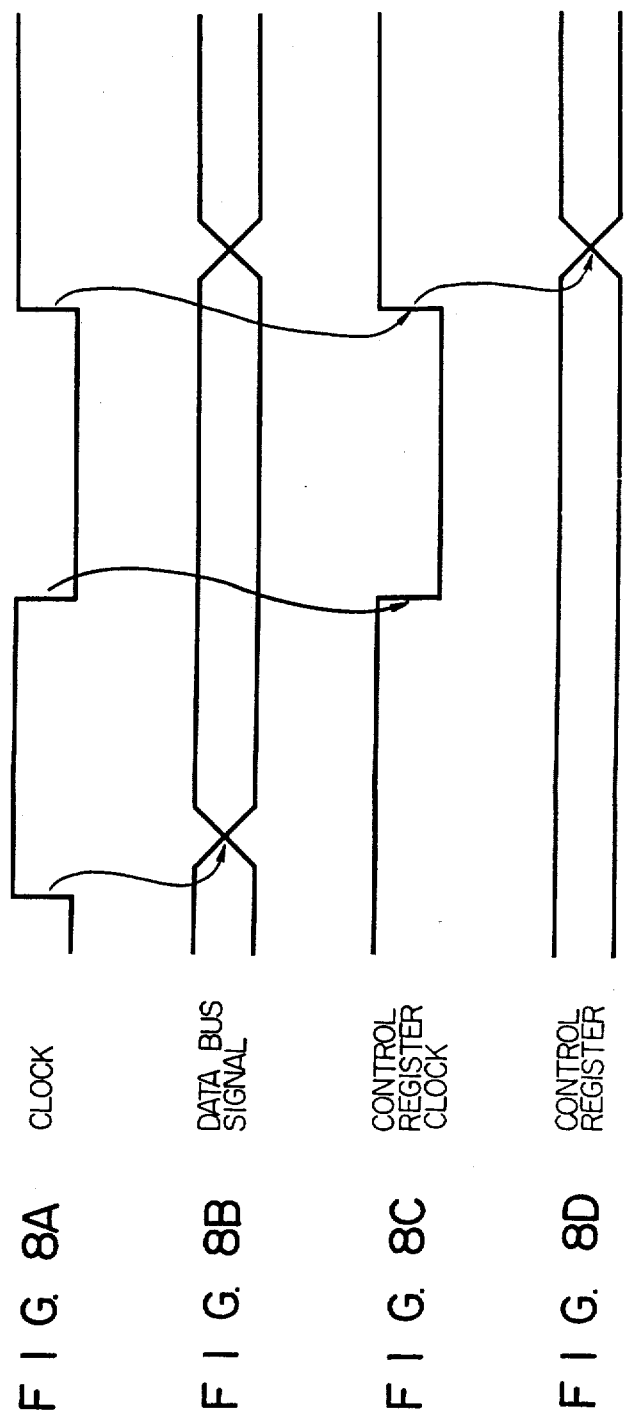
FIGS. 8A–8D show a set of timing charts for illustrating how DATA BUS signals are set in a control register in the embodiment in FIG. 6.

FIG. 8A shows a basic clock signal waveform. When the clock signal changes from LOW to HIGH level, a microprogram instruction to be executed is set in the ROM data register 14. If the instruction set at this time is an instruction for writing into the control register, the ROM DATA register produces the data field or part of the instruction onto the data bus and a control register clock signal (LOW level) into the control register. The flip-flops 61 to 66 constituting the control register 60 latch the data of DATA BUS's 0 to 5 at the leading edge of the control register clock.

As shown in FIG. 9, the control register specifies a combination of ALUs depending on the contents of the control register, i.e. data set therein. In the figure, the bits $b_0$ to $b_3$ correspond to the flip-flops 61 to 64 of the control register 60; the bits $b_4$ and $b_5$ to the flip-flops 65 and 66. The bits $b_0$ to $b_3$ are used to select the ALU for operation and the ALU for providing the carry flag Cn. The fifth and sixth flip-flops 65 and 66 are used to select the ALU for supplying the flag data to the flag register. ZERO FLAG is selected by the bits $b_0$ to $b_4$.

FIG. 9 shows the relations between the output values of the respective flip-flops 61 to 66 and ALU flag signals. As best illustrated in FIG. 6, the bit $b_0$ corresponding to the flip-flop 61 selects ALU CLOCK 0. Similarly, the bit $b_1$ selects ALU CLOCK 1; the bit $b_2$ selects ALU CLOCK 2; the bit $b_3$ selects ALU CLOCK 3; the bit 4 selects ALU CLOCK 4. As shown, when $b_0$ is "1" and the remaining bits $b_1$ to $b_5$ are all "0", ALU CLOCK 0 is outputted. When bits $b_0$, $b_1$ and $b_4$ are "1", ALU CLOCK 0 to ALU CLOCK 1 are outputted. Similarly, remaining combinations of bits select the corresponding combinations of ALU CLOCK signals, as shown in FIG. 9.

Figure 10:
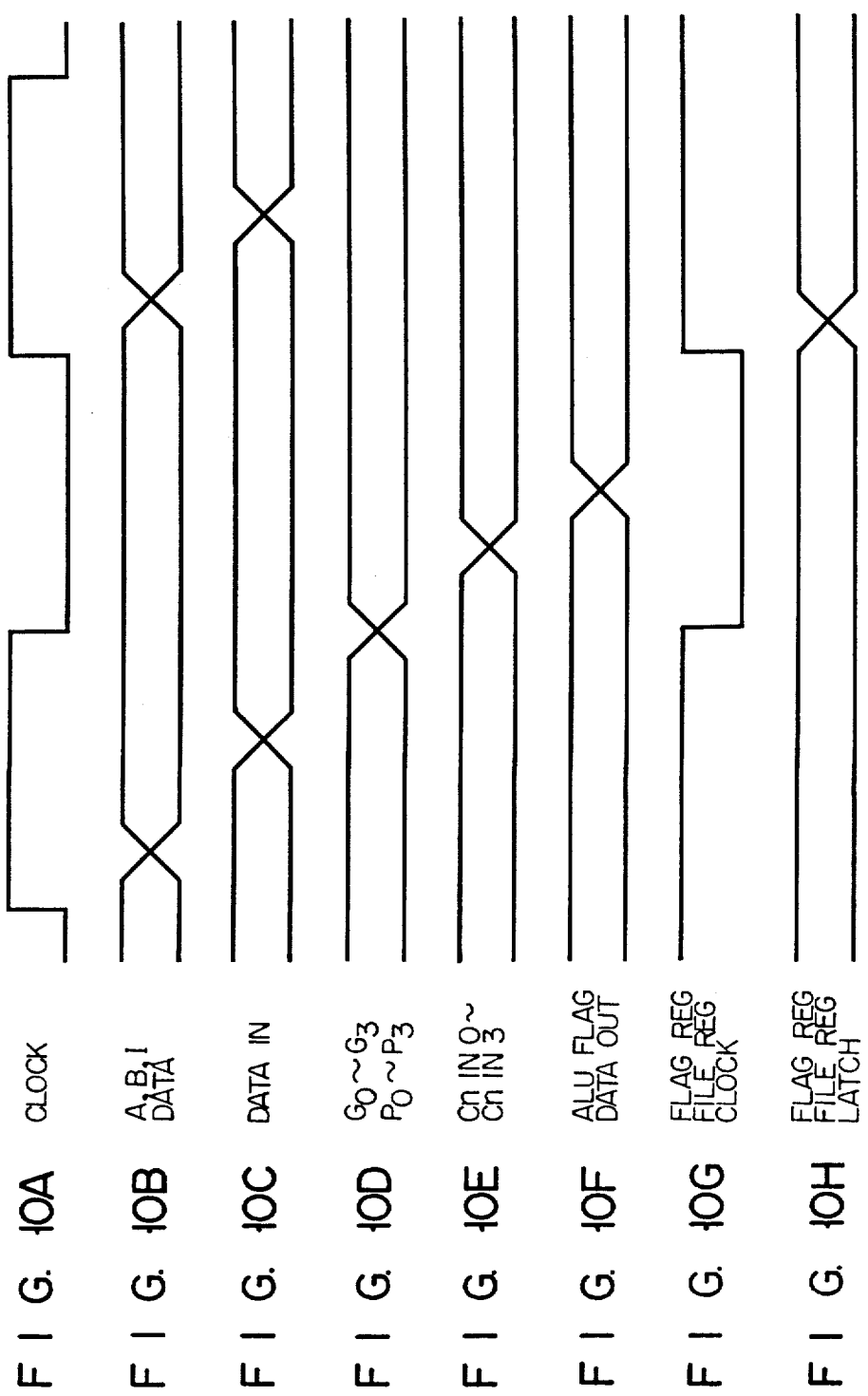
FIGS. 10A–10H show a set of timing charts for illustrating the executions of operation instructions.

The executing operation of an arithmetic instruction will be given with reference to FIG. 10. An arithmetic instruction is latched in the ROM data register 14 in response to a clock signal as shown in FIG. 10A. Upon the latching, the ROM data register 14 supplies an A address, a B address and an instruction data to the ALU as shown in FIG. 10B. If the arithmetic instruction is an instruction for using the data in the file register, it makes an access to the file register and the data bus produces the file data as shown in FIG. 10C. The respective ALU chips, upon the input information, produce a generate carry signal G and a propagate carry signal P, as shown in FIG. 10D. These signals G (G0 to G2) and P (P0 to P2) are supplied to the carry generator circuit which in turn produces signals from CnIN0 to CnIN3 as shown in FIG. 10E. Signals G (G0 to G2) and P (P0 to P2) are inputted to the carry generator circuit 74 and the carry generator circuit 74 produces signals CnIN0 to CnIN3 toward the ALU. In response to the signals, the ALU executes the specified operation including a carry and produces data as a result of the operation to the ALU BUS and at the same time the chips of the ALU produce flags, as shown in FIG. 10F. When the instruction to be currently executed is an instruction for setting a flag in the flag register, the ROM data register provides the flag register clock signal to the flag register. When the instruction is an instruction to set the result of the operation of the ALU in the file register, the ROM data register provides the file register clock signal to the file register. When the instruction is an instruction for specifying both the above ones, the ROM data register provides clock signals at LOW level to both the registers, as shown in FIG. 10G. As a result, the flag register or the file register are set at the leading edge of the signal, as shown in FIG. 10H. Accordingly, one instruction is executed for one cycle.

The explanation to follow is the executing operation of an operation instruction when data, $b_0=1$, $b_2=0$, $b_3=0$, $b_4=1$, $b_5=0$, are set in the control register. Firstly, the first, second and fifth flip-flops 61, 62 and 65 are set. See FIG. 6. As a result of the operation, the flag select signals become as follows: FLAG SEL 0 is LOW; FLAG SEL 1 LOW, FLAG SEL 2 HIGH, FLAG SEL 3 HIGH, FLAG SEL 4 HIGH, FLAG SEL 5 LOW. Accordingly, LOW level signals are applied to the first and second OR circuits 57 and 68 and HIGH level signals are applied to the third and fourth OR circuits 69 and 70. Therefore, clock signals are applied to ALU0 and ALU1 and continuous HIGH level signals are applied to the ALU2 and ALU3. As a result, the chips ALU0 and ALU1 start to operate.

A HIGH level signal is applied to one of the input terminals of the AND circuit 71 and a LOW level signal is applied to one input terminal of the OR circuit 75. A HIGH level signal is applied to one of the input terminals of the AND circuit 72; a LOW level signal to one input terminal of the OR circuit 76; a LOW level signal to one input terminal of the AND circuit 73; a HIGH level signal to one input terminal of the OR circuit 77.

Under this condition, when a carry takes place as a result of the operation in the ALU0 31, a generate carry signal G0 (LOW level) and a propagate carry signal P0 (LOW level) are outputted through the generate carry terminal 44 and the propagate carry terminal 45 of the ALU0 31. The propagate signal is applied to the other input terminal of the AND circuit 71 and the generate carry signal is applied to the other input terminal of the OR circuit 75. The AND circuit 71 and the OR circuit 75 produce LOW level signals. These LOW level signals are applied to the lookahead carry generator 74.

If there was no carry in the previous calculation, CnIN input is at LOW level and thus a LOW level signal is applied to the AND circuit 78. As a result, the output signals of the AND circuits 78 and 79 are both at LOW level, and are applied to the ALU0 31. The CnIN0 input 38 is at LOW level and the Cn input to be applied to the lookahead carry generator 74 is at LOW level. In the logic circuit of the lookahead carry generator 74 shown in FIG. 7, $\overline{G0}$ and $\overline{P0}$ inputs are both at LOW level and the input Cn is inverted by the inverter 81 and is at HIGH level. Accordingly, LOW level input signals are applied to both the input terminals of the AND circuit 85. A HIGH level signal is applied to one input terminal of the AND circuit 82 and a LOW level signal is applied to the other input terminal of the same. As a consequence, the output signals of the AND circuits 85 and 82 are both at LOW level and two LOW level signals are applied to the NOR circuit 96. The output of the NOR circuit 96 becomes at HIGH level and a HIGH level signal is applied to the terminal Cn+x of the lookahead carry generator 74.

When a carry takes place as a result of the operation in the ALU1 32, a generate carry signal G1 (LOW level) and a propagate carry signal P1 (LOW level) are outputted through the generate carry terminal and the propagate carry terminal of the ALU1 32. The propagate signal is applied to the other input terminal of the AND circuit 72 and the generate carry signal is applied to the other input terminal of the OR circuit 76. The AND circuit 72 and the OR circuit 76 both produce LOW level signals.

These LOW level signals are applied to the lookahead carry generator 74.

In the logic circuit of the lookahead carry generator 74 shown in FIG. 7, $\overline{G1}$ and $\overline{P}$ inputs are both at LOW level. The LOW level signals are applied to the input terminals of the AND circuits 83, 86 and 89. The AND circuits 83, 86 and 89 produce LOW level signals. These three LOW level signals are applied to the NOR circuit 97. The NOR circuit 97 produces a HIGH level signal. The HIGH level signal is applied to the Cn+y terminal of the lookahead carry generator 74. A HIGH level signal is applied to both the input terminals of AND circuit 92; one HIGH level signal and two LOW level signals are applied to three input terminals of the AND circuit 90; one HIGH level signal and three LOW level signals are applied to four input terminals of the AND circuit 87. Two HIGH level signals and two LOW level signals are applied to four input terminals of AND circuit 84. Therefore, the output of the AND circuit 92 is at HIGH level and the outputs of the AND circuits 90, 87 and 84 are at LOW level, with the result that one HIGH level signal and three LOW level signals are applied to four input terminals of the NOR circuit 98. The output of the NOR circuit 98 becomes at LOW level and a LOW level signal is outputted from the Cn+z terminal of the lookahead carry generator 74. In this case, a HIGH level signal from the output terminal Cn+x is applied to the input terminal CnIN1 of the ALU1 32 and a HIGH level signal from the output terminal Cn+y is applied to the input terminal CnIN2 of the ALU2 to produce a carry signal.

The ALU2 33 is not substantially effected when the HIGH level signal is applied to the input terminal CnIN2 thereof since the signal ALU CLOCK 2 is not applied thereto (a HIGH level signal is applied).

Accordingly, a carry signal is produced between the ALU chips ALU0 31 and ALU1 32.

Let us consider now a case where no carry is produced in the operation in the ALU0 31. The ALU0 31 produces HIGH level signals at the terminals P0 45 and G0 44. Two HIGH level signals are applied to the AND circuit 71 and the OR circuit 75 so that these circuits 71 and 75 produce HIGH level signals. In the logic circuit in FIG. 7, HIGH level signals are applied to both the input terminals of the AND circuit 85 so that the output of the circuit 85 at HIGH level and the output of the NOR circuit 96 is at LOW level. A LOW level signal is outputted from the Cn+x terminal of the lookahead carry generator 74 and no carry is produced.

The FLAG SEL 4 (HIGH level) and FLAG SEL 5 (LOW level) are applied to the multiplexers 41 to 43. Upon receipt of the signals, the multiplexer 41 produces a carry flag CnOUT1, the multiplexer 42 an oveflow flag OVR1 and the multiplexer 43 a sign flag SIN1 and the three signals produced are set in the carry flag register 51, the overflow flag register 52 and the sign flag register 53.

With respect to the zero flag register, FLAG SEL 0 signal (LOW), FLAG SEL 1 signal (LOW), FLAG SEL 2 signal (HIGH), FLAG SEL 3 signal (HIGH) are applied to one input terminal of the OR circuits 45 to 48, respectively. Hence, the outputs of the OR circuits 47 and 48 are at HIGH level. When the ALU0 to ALU1 are both "0", ZERO 0 signal and ZERO 1 signal are both at HIGH level so that the OR circuits 45 and 46 produce signals of HIGH level. Accordingly, to four input terminals of the AND circuit 49 are applied HIGH level signals, and the AND circuit 49 produces a HIGH level signal and the zero flag in the flag data register 50 is set to be in logical state "1". Unless either ALU0 31 or ALU1 is zero, the output of the AND circuit 49 is at LOW level so that the logical state "0" is set in the zero flag register 54.

Explanation will be given about the operation of the ALU2 and ALU3 chips. In this case, $b_0$ is set to "0", $b_1$ is set to "0", $b_2$ is set to "1", $b_3$ is set to "1", $b_4$ is set to "1" and $b_5$ is set to "1" in the control register 60. Accordingly, the levels of the flat select signals become as follows: FLAG SEL 0 signal is HIGH in level, FLAG SEL 1 HIGH, FLAG SEL 2 LOW, FLAG SEL 3 signal LOW, FLAG SEL 4 signal HIGH, FLAG SEL 5 HIGH. HIGH level signals are applied to the OR circuits 67 and 68 for selecting the ALU chips and LOW level signals are applied to the OR circuits 69 and 70. Since a clock signal is applied to the other input terminals of the OR circuits 67 to 70, the ALU clock is applied to the ALU CLOCK input terminals of the ALU2 chip 33 and ALU3 chip 34.

A LOW level signal is applied to the AND circuit 71; a HIGH level signal to the OR circuit 75; a LOW level signal to the AND circuit 72; a HIGH level signal to the OR circuit 76; a HIGH level signal to the AND circuit 73; a LOW level signal to the OR circuit 77. Accordingly, the outputs of the AND circuits 71 and 72 are LOW in level and the outputs of the OR circuits 75 and 76 are HIGH. Therefore, a LOW level signal is applied to the terminal $\overline{P0}$ of the carry lookahead generator 74; a HIGH level signal to the terminal $\overline{G0}$; a LOW level signal to the terminal $\overline{P1}$; a HIGH level signal to the terminal $\overline{G1}$.

Assume now that a carry is produced in the operation by the ALU2. On this assumption, the generate carry G2 of the ALU2 chip 33 and the propagate carry P2 are both at LOW level. These LOW level signals are both applied to the other input terminals of the AND circuit 73 and OR circuit 77 so that the outputs of the AND circuit 73 and the OR circuit 77 are both at LOW level. Accordingly, the inputs $\overline{P2}$ and $\overline{G2}$ of the lookahead carry generator 74 are at LOW level. In the logic circuit of the lookahead carry generator in FIG. 7, HIGH and LOW level signals are accordingly applied to the input terminals of the AND circuit 85 so that the output of the circuit 85 becomes LOW in level. Since HIGH level signals are applied to both the input terminals of the AND circuit 82, the output of the circuit 82 becomes HIGH. A HIGH and a LOW level signal are applied to the input terminals of the NOR circuit 96 so that the circuit 96 produces a LOW level signal. No carry signal is produced from the terminal Cn+x of the lookahead carry generator 74.

HIGH and LOW level signals are applied to the input terminal of the AND circuit 89, and therefore the output of the AND circuit 89 becomes LOW in level. Two HIGH level signals and one LOW level signal are applied to three input terminals of the AND circuit 86, so that the output of the circuit 86 becomes LOW. HIGH level signals are applied to three input terminals of the AND circuit 83 so that the circuit 83 produces a signal of HIGH level. Two LOW level signals and one HIGH level signal are applied to three input terminals of the NOR circuit 97 so that the output of the NOR circuit 97 becomes LOW in level.

Therefore, no carry signal is produced from the output terminal Cn+y of the lookahead carry generator 74. LOW level signals are applied to the two input terminals of the AND circuit 92 so that the output of the circuit 92 becomes a LOW level. Two LOW level signals and one HIGH level signal are applied to three input terminals of the AND circuit 90 so that the output of the AND circuit 90 becomes LOW. Two LOW level signals and two HIGH level signals are applied to four input terminals of the AND circuit 87 and hence the output of the circuit 87 becomes LOW. Three HIGH level signals and one LOW level signal are applied to the four input terminals of the AND circuit 84 so that the output of the circuit 84 becomes LOW. Therefore, LOW level signals are applied to all four input terminals of the NOR circuit 98 and the circuit 98 becomes HIGH in level. As a consequence, a carry signal is produced from the terminal Cn+z of the lookahead carry generator 74 and is applied to the carry signal input terminal of the ALU3 chip 34.

While the description has been made relating to the case where no carry is produced in the operation, when the carry is produced, the carry must be applied to the input terminal CnIN2 of the ALU2 33. In this case, the microprogram so controls that the carry input signal CnIN applied to the AND circuit 78 becomes HIGH in level and the signal CnON also becomes HIGH. Therefore, the output of the AND circuit 78 becomes HIGH, and the carry input signal Cn of the carry lookahead generator 74 becomes HIGH. In the logic circuit in FIG. 7, a LOW level signal is accordingly applied through the inverter 81 to the input of the AND circuit 83 so the output of the AND circuit 83 becomes LOW. Since LOW level signals are applied to the three inputs of the NOR circuit 97 the output of the circuit 97 becomes HIGH. For this, a carry signal is outputted from the terminal Cn+y of the carry lookahead generator 74 and the carry signal CnIN2 is applied to the carry input terminal of the ALU2 chip 33.

A LOW level signal is applied to the input terminal of the AND circuit 82 through the inverter 81. The AND circuit 82 produces a LOW level signal. LOW level signals are applied to both input terminals of the NOR circuit 96. The NOR circuit 96 produces a HIGH level signal. Accordingly a carry signal is produced from the output terminal Cn+x of the lookahead carry generator 74. The carry signal CnIN1 is applied to the carry input terminal of the ALU1 32 but the ALU1 32 is not affected since the ALU CLOCK 1 signal is not applied thereto.

In the information processor thus constructed, the control register 60 is controlled by the microprogram so that the flag select signals may be controlled. Accordingly, the flag signals (carry flag, overflow flag, sign flag, zero flag) from a desired ALU chip may be set in the flag data register. For this, an effective operation is possible. The ALU chip may be selected by controlling the control register 60 through the microprogram. This implies that an optimum combination of the ALU chips may be obtained in accordance with the operation of a desired bit number, for example, 4-bit operation and 8-bit operation.

Furthermore, the circuit is so designed that, when a carry occurs, the carry signal is applied in accordance with various combinations of the chips. For this, an operation of an optimum number is possible without increasing the burden of the microprogram. With such a construction, if two of four ALU chips are used, the file register and the work register contained in the remaining two ALU chips may be used as arithmetic registers. For example, the 16 bit file register can be used in two 8 bit groups A and B or C and D for the same address as shown in Table 3.

TABLE 3

| FILE ADDRESS | 16 bits | |
|---|---|---|
| | | 8 bits |
| 0 | A | B |
| 1 | C | D |
| 2 | E | E |
| 3 | F | F |

When $b_0$ is set to "1", $b_1$ is set to "1", $b_2$ is set to "0", $b_3$ is set to "0", $b_4$ is set to "1" and $b_5$ is set to "0" in the control register 60, the operation of A or C is carried out. The operation of B or D is performed when $b_0=0$, $b_1=0$, $b_2=1$, $b_3=1$, $b_4=1$ and $b_5=1$. When $b_0=1$, $b_1=1$, $b_2=1$, $b_3=1$, $b_4=1$ and $b_5=1$, the operation of E or F is performed.

In the above-mentioned embodiment, the ALU chips are each constructed by 4 bits and up to 4 chips (16 bits) are usable. However, the ALU chip may be constructed by a multiple of 4 bits and the number of chips may be selected arbitrarily as required. Also in this case, the same effects as those by the above-mentioned embodiment may be secured.

Figure 11:
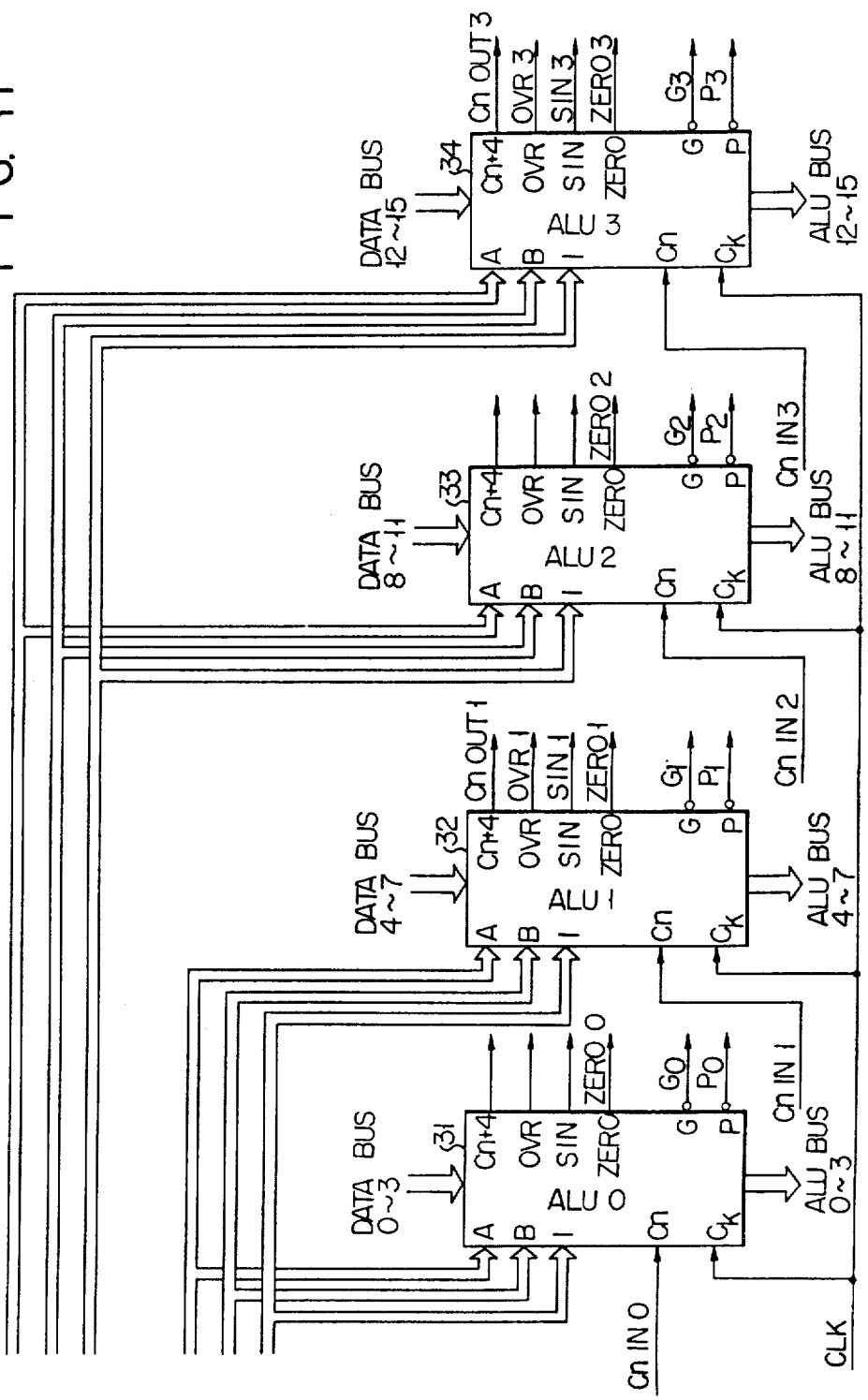
FIG. 11 shows a block diagram of an arithmetic/logic unit used in still another embodiment according to the invention.

Turning now to FIG. 11, there is shown another example of the arithmetic/logic unit used in another embodiment according to the invention. In this example, the ALU chips are divided into two groups; one group consists of ALU0 chip 31 and ALU1 chip 32 and the other group consists of ALU2 chip 33 and ALU3 chip 34. These groups independently operate, that is to say, one group executes an operation different from that executed by the other group. The same signals, such as an A address signal, a B address signal and an instruction signal, may be applied to the ALU0 and ALU1. Similarly, the same signals (but these are different from those applied to the above ALUs), such as an A address signal, a B address signal, and an instruction signal, may also be applied to ALU2 33 and ALU3 34. The same signals may of course be applied to all the ALUs. In this case, the ALUs operate as a 16-bit arithmetic/logic unit.

Figure 12:
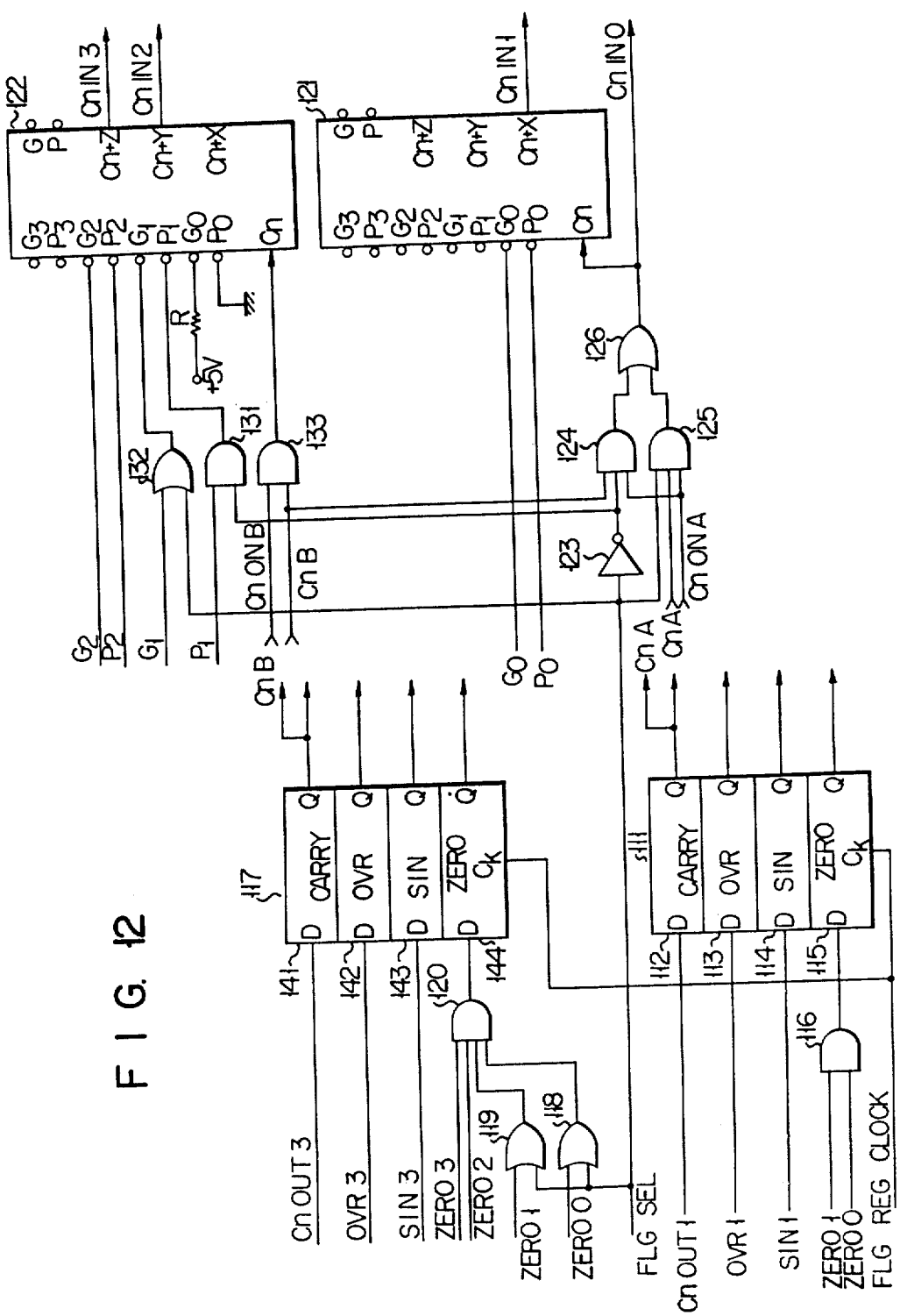
FIG. 12 shows a block diagram of an ALU control circuit for controlling the ALU shown in FIG. 11.

The operations of the ALUs will be described with reference to FIG. 12. The description to be given includes a case where two groups concurrently operate and another case where both the groups operate as a single ALU. FIG. 12 shows an ALU control circuit for controlling the ALU groups shown in FIG. 11. A flag data register A 111 is comprised of a carry flag register 112, an overflow flag register 113, a sign flag register 114 and a zeo flag register 115. Each of these registers is comprised of a D-type flip-flop. The respective flags (SIN1, OVR1, CnOUT1) of the ALU1 chip 32 are set in the corresponding registers. Zero flag signals ZERO 0 and ZERO 1 of the ALU0 31 and ALU1 32 are set in the zero flag register 115 through an AND gate 116. The setting of it into the flag register 111 is carried out in response to a flag register clock (FLG REG CLOCK) applied to a clock input terminal CK of the flag register 111.

The flag data register B 117 has a construction similar to the flag data register A 111, and includes a carry flag register 141, an overflow flag register 142, a sign flag register 143, and a zero flag register 144. The data register B 117 receives the respective flags (CnOUT3, OVR 3, SIN 3) from the ALU3 chip 34, and zero flag signals ZERO 0 to ZERO 3 from the ALU0 to ALU3, through OR circuits 118 and 119 and an AND circuit 120.

A lookahead carry generator A 121 is used to make a carry in the group A (ALU0 31 and ALU1 32) and has a construction similar to the lookahead carry generator shown in FIG. 6. A generate carry signal (G0) and a propagate carry signal (P0) outputted from the terminal G and the terminal P of the ALU0 31 are applied to terminal $\overline{G0}$ and $\overline{P0}$ of the carry generator 121. A flag select signal, a carry input signal, and a carry-on signal from the microprogram are applied to the carry input terminal Cn, through first and second AND circuits 124 and 125, and an OR circuit 126.

A lookahead carry generator B 122 is used for making a carry in the group B (ALU2 chip 33 and ALU3 chip 34) and has a construction similar to the lookahead carry generator A 121. The terminal $\overline{G0}$ of the generator B 122 is connected to a power source (+5 V) through a resistor R and the $\overline{P0}$ terminal is grounded. A propagate carry signal P1 and a generate carry signal G1 from the ALU1 chip 32, together with the flag select signal, are applied to the terminals $\overline{P1}$ and $\overline{G1}$, through an AND circuit 131 and an OR circuit 132. A propagate signal P2 and a generate signal G2 from the ALU2 33 are applied to the terminals $\overline{P2}$ and $\overline{G2}$, respectively. A carry flag signal from the flag data register B 117 and a carry-on signal are applied through the AND circuit 133 to the carry input signal Cn.

With such a construction, when the flag select signal is HIGH in level, and ALUs in the groups A and B independently operate. When it is LOW, the two groups operate as a single group, i.e. a 16 bit single ALU.

When the flag select signal is at HIGH level, a LOW level signal is applied to the AND gate 124 through the inverter 123 so that the output of the AND circuit 124 becomes at LOW level and a LOW level signal is applied to one of the input terminals of the OR circuit 126. The carry signal CnONA from the microprogram is a HIGH level when the carry flag resulting from the preceding operation is needed. When no carry is produced as a result of the operation, the carry signal CnA from the flag data register A 111 is LOW level. Thus, one LOW level signal and two HIGH level signals are applied to three input terminals of the AND circuit 125 so that the output of the AND circuit 125 becomes LOW in level and a LOW level signal is applied to the OR circuit 126. Accordingly, LOW level signals are applied to both input terminals of the OR circuit 126 and the circuit 126 produces a LOW level signal at the output. The signal CnIN0 at LOW level is applied to the ALU0 chip 31. When a carry occurs in the operation, the carry signal CnA is at HIGH level so that HIGH level signals are applied to three input terminals of the AND circuit 125. As a result, the output of the circuit 125 becomes HIGH in level and a HIGH level signal is applied to the OR circuit 126. Accordingly, the OR circuit 126 produces a HIGH level signal so that a HIGH level carry signal CnIN0 is applied to the carry input terminal of the ALU0 31. As a result of the ALU0 31, if a carry occurs, LOW level signals are outputted from the terminals G and P of the ALU0 31 and are applied to the terminals $\overline{G0}$ and $\overline{P0}$ of the carry generator 121. Therefore, through the logic circuit shown in FIG. 5, a HIGH level signal is outputted from the terminal Cn+x. In this case, the carry signal CnIN1 at HIGH level is applied to the carry input terminal of the ALU1 32. The carry flag CnOUT1, the overflow flag OVR1, and the sign flag SIN1 from the ALU1 32 are set in the carry flag register 112, the overflow flag register 113, and the sign flag register 114 of the flag register A 111. The zero flag signal ZERO 0 from the ALU1 chip 32 and the zero flag signal ZERO 1 from the ALU1 chip 32 are set in the zero flag register 115 through the AND circuit 116. When no carry occurs in the operation of the ALU0 chip 31, HIGH level signals are outputted from the terminals G and P of the ALU0 chip 31 and therefore a LOW level signal is outputted from the terminal Cn+x. Accordingly, in this case, no carry signal is applied to the carry input terminal Cn of the ALU1 chip 32.

Let us consider now the group B (ALU2 chip 33 and ALU3 34). When a carry takes place in the operation of the ALU2 chip 33, the ALU2 chip 33 produces LOW level signals from the terminals G and P and these signals are applied to the terminals $\overline{P2}$ and $\overline{G2}$ of the carry generator 122. The flag select signal at HIGH level is applied to the other input terminal of the OR circuit 132 while the flag select signal at LOW level is applied to the other input terminal of the AND circuit 131 through the inverter 123. Accordingly, when the generate carry signal (G1) and propagate signal (P1) of the ALU1 32 are applied to the other input terminal of the OR circuit 132 and the AND circuit 131, the output of the OR circuit 132 is at HIGH level and the output of the AND circuit 131 is at LOW level independent of the HIGH or LOW level of the generate carry signal (G1) and propagate signal (P1). Accordingly, a LOW level signal is applied to the terminal $\overline{P1}$ of the carry generator B 132 and a HIGH level signal to the terminal G1. Further to the terminal G0 is applied a HIGH level signal while to the terminal $\overline{P0}$ is applied a LOW level signal. The carry signal CnONB from the microprogram is at LOW level when the carry flag resulting from the preceding operation is needed and the carry signal CnB at LOW level from the flag data register 117 is applied to the carry input terminal Cn through the AND circuit 133 when no carry is produced in the previous operation.

In the logic circuit in FIG. 7, a HIGH level signal and a LOW level signal are accordingly applied to the AND circuit 85 and the output of the AND circuit 85 becomes LOW in level. HIGH level signals are applied to the AND circuit 82 and the output of the AND circuit 82 is HIGH. Accordingly, LOW and HIGH level signals are applied to the input terminals of the NOR circuit 96 so that the output of the NOR circuit 96 is LOW. A LOW level signal is thus outputted from the terminal Cn+x of the carry generator B and no carry is produced.

HIGH and LOW level signals are applied to the inputs of the AND circuit 89 and the output of the circuit 89 becomes LOW. Two HIGH level signals and one LOW level signal are applied to three input terminals of the AND circuit 86 so that the output of the AND circuit 86 becomes LOW. HIGH level signals are applied to three input terminals of the AND circuit 83 so that the output of the AND circuit 83 becomes HIGH. Accordingly, two LOW level signals and one HIGH level signal are applied to three input terminals of the NOR circuit 97 and therefore the output of the NOR circuit 97 is LOW in level. A LOW level signal is outputted from the terminal Cn+y of the lookahead carry generator 122. A carry signal CnIN2 at LOW level is applied to the carry input terminal of the ALU2.

LOW level signals are applied to the AND circuit 92 and the output of the AND circuit 92 becomes LOW. Two LOW level signals and one HIGH level signal are applied to three input terminals of AND circuit 92 and the AND circuit 92 produces a LOW level signal at the output. Two HIGH level signals and two LOW level signals are applied to four input terminals of the AND circuit 87 and the AND circuit 87 produces a LOW level signal at the output. Two HIGH level signals and two LOW level signals are applied to four input terminals of the AND circuit 84, and the AND circuit 84 produces a LOW level signal at the output of the AND circuit 84. Accordingly, LOW level signals are applied to four input terminals of the NOR circuit 98, and the output of the NOR circuit 98 becomes HIGH in level. A HIGH level signal is produced from the terminal Cn+z of the carry generator B 122 and a carry signal CnIN3 at HIGH level is applied to the carry input terminal of the ALU3.

When a carry is produced in the previous operation, carry signal CnB is at HIGH level so that a signal to be applied to the carry input terminal Cn of the carry generator B 122 becomes HIGH in level. Accordingly, a LOW level signal is applied to one of the input terminals of the AND circuit 83 in FIG. 5 and the output of the AND circuit 83 is at LOW level. Accordingly, low level signals are applied to three input terminals of the NOR circuit 97 and the NOR circuit 97 produces a HIGH level signal. A HIGH level signal is produced from the terminal Cn+y of the carry generator B 122 so that a carry signal CnIN2 at HIGH level is applied to the carry input terminal of the ALU2 chip 33. Then, the carry flag CnOUT3, the overflow flag OVR3, the sign flag SIN3 of the ALU2 chip 34 are set in the carry generator B 117. With respect to the zero flag, since the groups A and B independently operate, the flag select signal at HIGH level is applied to the input terminals of the OR circuits 118 and 119 so that the outputs of the OR circuits 118 and 119 are both HIGH in level and HIGH level signals are applied to two of the four input terminals of the AND circuit 120. Accordingly, if ALU2 33 and ALU3 34 are both zero as a result of the operations, HIGH level signals are applied to the AND circuit 120 and thus a zero flag on signal (logical state "1") is set in the zero flag register 144. Unless either ALU2 33 or ALU3 34 is zero, the output of the AND circuit 120 becomes LOW and the logical state "0" is set in the zero flag register 144.

In this way, the groups A and B may be operated independently.

Explanation will be given about a case where the ALUs in groups A and B operate as a single ALU of 16 bits. In this case, the flag select signal is supplied at LOW level. When a carry is produced, a HIGH level signal is produced from the terminal Cn+x of the carry lookahead generator 121 and a carry signal CnIN1 is applied to the carry input terminal of the ALU1 32. When a carry is produced in the operation of the ALU1 32, a HIGH level signal is outputted from the terminal Cn+y of the carry generator B 122 and a carry signal is applied to the carry input terminal of the ALU 33. When a carry is produced in the operation of ALU2 33, a HIGH level signal is produced from the terminal Cn+z of the carry generator B 122 and a carry signal CnIN3 is applied to the carry input terminal of the ALU 34. When the carry signal is ON as a result of the operation, the carry signal CnIN0 is applied to the carry input terminal of the ALU0 31. More specifically, when a carry is produced in the ALU0, LOW level signals are produced from the terminals G and P of the ALU0 31. Accordingly, a HIGH level signal is produced from the terminal Cn+x of the generator A 121 and thus a carry signal CnIN1 is applied to the carry input terminal of the ALU1 32.

When a carry is produced in the operation of the ALU1 32, LOW level signals G1 and P1 are produced from the terminals G and P of the ALU1. Accordingly, LOW level signals are applied to the input terminals of the OR circuit 132 and the AND circuit 131. A flag select signal at LOW level is applied to the OR circuit 132. A flag select signal at HIGH level is applied to the other input terminal of the AND circuit 131, through the inverter 123. The outputs of the OR circuit 132 and the AND circuit 131 are accordingly LOW in level.

In the logic circuit in FIG. 7, LOW level signals are applied to the AND circuit 89 and the output of the AND circuit 89 becomes LOW in level. Two LOW level signals and one HIGH level signal are applied to three input terminals of the AND circuit 86 and the output of the AND circuit 86 becomes LOW. The AND circuit 83 is at LOW level at the two input terminals and at HIGH level at one input terminal of three so that the AND circuit 83 produces a signal at LOW level. Accordingly, all the three input terminals of the NOR circuit 97 are at LOW level and the output of the NOR circuit 97 is at HIGH level. A HIGH level signal is produced from the terminal Cn+y of the carry generator B 122 so that a carry signal CnIN2 is applied to the carry input terminal of the ALU2 23.

When a carry is produced in the operation of the ALU2, the generate carry G2 and the propagate carry P2 are LOW in level so that, in the logic circuit in FIG. 5, a LOW level signal is applied to the input terminals of the AND circuit 92 and the output of the AND circuit 92 becomes LOW. LOW level signals are applied to all the three input terminals of the AND circuit 90 and the output of the AND circuit 90 is LOW. Since three LOW level signals and one HIGH level signal are applied to the four input terminals of the AND circuit 87, the AND circuit 87 produces a signal at LOW level. Three LOW level signals and one HIGH level signal are applied to the AND circuit 84 so that the output of the AND circuit 84 becomes LOW. Accordingly, LOW level signals are applied to all the four input terminals of the NOR circuit 98 and thus the NOR circuit 98 produces a HIGH level signal.

A HIGH level signal is outputted from the terminal Cn+z of the carry generator B 122 so that a carry signal CnIN3 is applied to the carry input terminal of the ALU3.

When a carry is produced as a result of the preceding operation, a HIGH level carry signal CnB is produced from the carry register of the flag data register B 117 and is applied to the AND circuit 124. Further, a LOW level flag select signal is inverted by the inverter 123 and is applied as a HIGH level signal to the AND circuit 133. The carry signal CnONA from the microprogram is applied as a HIGH level signal to the AND circuit 124. For this, the output of the AND circuit 124 is HIGH in level and is applied as a HIGH level signal to one input terminal of the OR circuit 126 of which the other input terminal receives a LOW level signal from the AND circuit 125. Therefore, the output of the OR circuit 126 becomes HIGH in level, and a carry signal CnIN0 is applied to the carry input terminal of the ALU0 31.

The HIGH level carry signal CnB is also applied to the one input terminal of the AND circuit 133 and the output signal from the AND circuit 133 becomes HIGH in level when the input signal CnONB from the microprogram is at HIGH level.

The output signal from the AND circuit 133 is applied to the carry input terminal Cn of the carry generator 122. Accordingly the carry generator 121 adds the carry signal to the levels (HIGH or LOW) of the generate carry signal G0 and the propagate carry signal P0 and produce the output signal CnIN1 (HIGH or LOW level) at the output terminal Cn+x thereof.

The output signal CnIN1 is applied to the carry input terminal Cn of ALU 132. The carry generator 122 adds the carry signal to the levels (HIGH or LOW) of the generate carry signals G1, G2 and the propagate carry signals P1, P2 and produces the output signal CnIN2 (HIGH or LOW level) at the output terminal Cn+y thereof. The output signal CnIN2 is applied to the carry input terminal of the ALU2 33.

Furthermore, the carry generator 122 produces the output signal CnIN3 (HIGH or LOW level) at the output terminal Cn+z thereof and applies the signal to the carry input terminal of the ALU3 34. The carry flag CnOUT3, the overflow flag OVR3 and the sign flag SIN3 from the ALU3 34 are set in the flag data register B 117. With respect to the zero flag, if the results of the operations of the ALU0 to ALU3 are all zero, HIGH level signals are applied to the OR circuit 118 and 119 and the outputs of these circuits 118 and 119 are both HIGH in level. HIGH level signals are applied to four input terminals of the AND circuit 120 and the output of the AND circuit 120 is HIGH in level. The zero flag register in the flag data register 117 becomes "ON". Unless any one of the operation results of the ALUs 31 to 33 is zero, a LOW level signal is applied to the AND circuit 120 so that a zero flag of OFF (logical state "0") is set in the zero flag register.

As described above, by setting the flag select signal at LOW or HIGH level, the arithmetic/logic unit may be operable as a single ALU of 16 bits or two ALUs each of 8 bits. Therefore, the operation is possible in parallel fashion and the operation time may be shortened.

What is claimed is:

1. An information processor for performing processing operations upon externally supplied data including control data under the control of a microprogram comprising:

a read only memory for storing microprograms at associated execution addresses, each said microprogram comprising a set of processing instructions;

a microprogram sequencer connected to said read only memory for producing the execution address of a said stored microprogram and for controlling said read only memory to output said instructions comprising said microprogram associated with said produced execution address;

a read only memory data register connected to said read only memory for latching the instructions outputted from said read only memory;

a data bus for receiving said data including said control data;

a register file connected to said data bus for receiving data including said control data therefrom;

an arithmetic/logic unit comprising a plurality of ALU chips of a selected bit length connected to said read only memory data register for receiving said outputted instructions and to said register file for receiving data from said register file and for performing processing operations on said data received from said register file in response to said instructions received from said read only memory data register, each of said ALU chips having associated therewith flag data including a carry flag signal, a sign flag signal, a zero flag signal, and an overflow flag signal for indicating the status of said associated ALU chip; and ALU circuit control means connected to said arithmetic/logic unit and said data bus for selecting ALU chips in accordance with said instructions latched in said read only memory data register so as to carry out said processing operations on said data provided by said register file in accordance with said instructions of said latched microprogram, wherein each of said performed operations is constituted of bits the number of which is defined by the selected ALU chips, said ALU circuit control means for selecting said carry flag signal, said sign flag signal, said zero flag signal, and said overflow flag signal associated with one of said selected ALU chips in accordance with said received data to indicate the status of said arithmetic/logic unit.

2. An information processor according to claim 1, in which said ALU circuit control means includes flag selection circuit means for selecting which of the ALU chips is used to produce flag data.

3. An information processor according to claim 2, in which said flag selection circuit means is comprised of:
  a first multiplexer connected to the ALU chips, for receiving said carry flag signals from said ALU chips and for producing a selected carry flag signal from said ALU chip specified by said control data from said data bus;
  a second multiplexer connected to said ALU chips, for receiving said overflow flag signals from said respective ALU chips and for producing a selected overflow flag signal from said ALU chip specified by said information data from said data bus;
  a third multiplexer connected to said ALU chips, for receiving said sign flag signals from said respective ALU chips and for producing a selected sign flag signal from said ALU chip specified by said control data from said data bus;
  a fourth multiplexer connected to said ALU chips, for receiving said zero flag signals from said ALU chips by way of a logic circuit and for producing a selected zero flag signal from said ALU chip specified by said control data from said data bus; and
  a flag data register connected to said first to fourth multiplexers, for latching said selected flag signals from said respective multiplexers.

4. An information processor according to claim 1, in which said ALU control circuit is comprised of:
  flag selection circuit means for selecting an ALU chip from which said associated flag data is to be outputted in accordance with said control data from said data bus;
  ALU clock means for supplying ALU clock signals;
  ALU selection circuit means for selecting an ALU chip to which said ALU clock signals are to be supplied in accordance with said control data from said data bus;
  a carry generator for supplying a carry signal; and
  generator control circuit means for controlling said carry generator to supply a said carry signal to said ALU chip selected by said ALU selection circuit means.

5. An information processor according to claim 4, in which said flag selection circuit means is comprised of:
  a control register for latching said control data received by said data bus;
  a first multiplexer connected to said respective ALU chips for receiving said carry flag signals from said ALU chips and for outputting the carry flag signal associated with an ALU chip specified by said control data received by said data bus;
  a second multiplexer connected to said ALU chips for receiving said overflow flag signals from said ALU chips and for outputting said overflow flag signal associated with a said ALU chip specified by said control data received by said data bus;
  a third multiplexer connected to said ALU chips for receiving said sign flag signals from said ALU chips and for outputting the sign flag signal associated with a said ALU chip specified by said control data received by said data bus;
  logic circuit means connected to said ALU chips for receiving said zero flag signals from said ALU chips and for outputting the zero flag signal associated with a said ALU chip specified by said control data received by said data bus; and
  a flag data register connected to said first to third multiplexers and said logic circuit means for latching said flag signals outputted by said first to third multiplexers and said logic circuit means.

6. An information processor according to claim 5, in which data bus information latched in said control register is comprised of:
  flag selection information for selecting the ALU chip from which flag data is to be outputted;
  ALU chip selection information for selecting the ALU chip to be operated; and
  carry generate control information for controlling the carry generator for supplying a carry signal to said ALU chip.

7. An information processor according to claim 4, in which said ALU selection circuit means is comprised of:
  a control register for latching said information data received by bus
  means for generating a clock signal; and
  logic circuit means having a first input terminal for receiving said clock signal and a second input terminal for receiving said information data latched in said control register, said logic circuit means for supplying said ALU clock signals to a said ALU chip specified by said control data received by said bus.

8. An information processor according to claim 4, wherein each of said ALU chips produces an associated generate carry signal and an associated propagate carry signal and in which said carry generator control circuit means is comprised of:
  a control register for latching said control data received by said data bus;
  first logic circuit means having a first input terminal for receiving said information data received by said data bus, a plurality of second input terminals for receiving said propagate carry signals from said ALU chips, and a plurality of third input terminals for receiving said generate carry signals from said ALU chips, said first logic circuit means for controlling said carry generator to supply a said carry signal to ALU chips specified by said control data received by said bus; and second logic circuit means responsive to said carry signal generated by said carry generator for supplying to said carry generator and said ALU chips a carry select signal a carry specifying signal and said control data received by said bus.

9. An information processor according to claim 4, in which said carry generator is a lookahead carry generator.

10. An information processor according to claim 1, in which each of said ALU chips are comprised of a multiple of 4 bits.

11. An information processor for performing processing operations on externally supplied data including control data under the control of a microprogram comprising:
- a read only memory for storing microprograms at associated execution addresses, each of said microprograms comprising a set of processing instructions;
- a microprogram sequencer connected to said read only memory for producing the execution address of a said stored microprogram, and for controlling said read only memory to output said instructions comprising said microprogram associated with said produced execution address;
- a read only memory data register connected to said read only memory for latching the instructions outputted from said read only memory;
- a data bus for receiving said externally supplied data including said control data;
- a register file connected to said data bus for storing said data received by said data bus including said control data;
- first and second ALU groups each comprised of a plurality of ALU chips of predetermined bit widths, each said ALU chip being connected to said read only memory data register and said register file and having associated therewith flag data including a carry flag signal, a sign flag signal, a zero flag signal, and an overflow flag signal for indicating the status of said ALU chips, said first and second ALU groups for performing processing operations on said data received from said register file in accordance with said instructions of said microprogram latched in said read only memory data register; and
- ALU circuit control means connected to said first and second ALU groups and said data bus for selecting among said first and second ALU groups in accordance with said instructions latched in said read only memory data register to carry out said processing operations on said data provided by said register file wherein each operation is constituted of bits the number of which is defined by the bit widths of said ALU chips included in said selected groups of ALU chips, said ALU circuit control means for selecting among said flag data associated with said ALU chips in said selected ALU group to indicate the status thereof.

12. An information processor according to claim 11, wherein said control data received by said data bus includes ALU control information having a first value or a second value, in which said first and second ALU groups independently operate when said ALU control information received by said data bus has said first value and operate as a single ALU group when said ALU control information has said second value.

13. An information processor according to claim 11, further including a first carry generator and a second carry generator, in which said ALU control circuit means is comprised of:
- a first flag data register for latching said flag data associated with said ALU chips included in said first ALU group;
- a second flag register for latching said flag data associated with said ALU chips in said second ALU group;
- first logic circuit means connected to said first carry generator for receiving said control data from said data bus, for controlling said first carry generator to produce a carry signal when a carry occurs in said first ALU group; and
- second logic circuit means connected to said second carry generator for receiving said control data from said data bus, for controlling said second carry generator to produce a carry signal when a carry occurs in said second ALU group.

14. An information processor according to claim 10, in which said first and second carry generators comprise a lookahead carry generator.

15. An information processor according to claim 8, in which each of said first and second ALU groups are each comprised of a multiple of 4 bits.

* * * * *